US008279711B2

(12) United States Patent
Nance et al.

(10) Patent No.: US 8,279,711 B2
(45) Date of Patent: Oct. 2, 2012

(54) DIGITAL AIR GUN

(75) Inventors: William Allen Nance, Fredericksburg, TX (US); Daniel Eugene Hobson, Kerrville, TX (US)

(73) Assignee: Real Time Systems, Inc., Fredericksburg, TX (US)

( * ) Notice: Subject to any disclaimer, the term of this patent is extended or adjusted under 35 U.S.C. 154(b) by 114 days.

(21) Appl. No.: 12/789,276

(22) Filed: May 27, 2010

(65) Prior Publication Data
US 2010/0302902 A1    Dec. 2, 2010

Related U.S. Application Data

(60) Provisional application No. 61/217,204, filed on May 28, 2009.

(51) Int. Cl.
*G01V 1/137* (2006.01)
(52) U.S. Cl. ........................................................ 367/144
(58) Field of Classification Search ................... 367/144
See application file for complete search history.

(56) References Cited

U.S. PATENT DOCUMENTS

| 3,588,039 | A | 6/1971 | Chelminski et al. |
|---|---|---|---|
| 4,027,850 | A | 6/1977 | Allen |
| 4,038,630 | A | 7/1977 | Chelminski |
| 4,047,591 | A | 9/1977 | Ward et al. |
| 4,106,585 | A | 8/1978 | Huizer |
| 4,210,222 | A | 7/1980 | Chelminski et al. |
| 4,219,097 | A | 8/1980 | Harrison et al. |
| 4,219,098 | A | 8/1980 | Thomson et al. |
| 4,225,009 | A | 9/1980 | Harrison et al. |
| 4,230,201 | A | 10/1980 | Bays |
| 4,234,052 | A | 11/1980 | Chelminski |
| 4,240,518 | A | 12/1980 | Chelminski |
| 4,246,979 | A | 1/1981 | Thomson et al. |
| 4,266,844 | A | 5/1981 | Chelminski |
| 4,472,794 | A | 9/1984 | Chelminski |
| 4,599,712 | A | 7/1986 | Chelminski |
| 4,621,170 | A | 11/1986 | Picandet |
| 4,623,033 | A | 11/1986 | Harrison, Jr. |

(Continued)

FOREIGN PATENT DOCUMENTS

CN    2433782    6/2001

(Continued)

OTHER PUBLICATIONS

Notification of Transmittal of the International Search Report and the Written Opinion of the International Search Authority for International Application PCT/US2010/036423 mailed Feb. 23, 2011 (18 pages).

(Continued)

*Primary Examiner* — Isam Alsomiri
*Assistant Examiner* — James Hulka
(74) *Attorney, Agent, or Firm* — Fish & Richardson P.C.

(57) ABSTRACT

A marine air gun generates an acoustic signal in water, for example, during a marine seismic survey. The marine air gun includes digital electronic circuitry. The digital electronic circuitry may control an actuator of the marine air gun, digitize and store data from sensors located on or near the marine air gun, send and/or receive digital communications, store and/or output electrical energy, and/or perform other functions. A marine seismic source system that includes multiple air gun clusters may have a separate digital communication link between a command center and each air gun cluster. Each communication link may provide power and digital communication between the command center and one of the air gun clusters.

27 Claims, 18 Drawing Sheets

U.S. PATENT DOCUMENTS

| | | | |
|---|---|---|---|
| 4,712,202 | A | 12/1987 | Chelminski |
| 4,713,800 | A | 12/1987 | Russell |
| 4,715,023 | A | 12/1987 | Otto |
| 4,754,443 | A | 6/1988 | Chelminski |
| 4,774,696 | A | 9/1988 | Otto |
| 4,779,245 | A | 10/1988 | Chelminski |
| 4,798,261 | A | 1/1989 | Chelminski |
| 4,858,205 | A | 8/1989 | Harrison |
| 5,001,679 | A | 3/1991 | Harrison |
| 5,228,010 | A | 7/1993 | Harrison |
| 5,315,917 | A | 5/1994 | Mayzes |
| 5,432,757 | A | 7/1995 | Chelminski |
| 5,572,486 | A | 11/1996 | Landro et al. |
| 5,615,170 | A | 3/1997 | Chelminski |
| 5,825,719 | A | 10/1998 | Harrison, Jr. |
| 6,470,997 | B1 | 10/2002 | McCall et al. |
| 6,570,820 | B2 | 5/2003 | Patel et al. |
| 6,612,396 | B1 | 9/2003 | Chelminski et al. |
| 6,788,618 | B2 | 9/2004 | Clayton et al. |
| 6,873,571 | B2 | 3/2005 | Clayton et al. |
| 7,269,099 | B2 | 9/2007 | Jensen |
| 7,321,527 | B2 | 1/2008 | Hopperstad et al. |
| 7,359,282 | B2 * | 4/2008 | Tulett ............................... 367/23 |
| 7,379,391 | B2 | 5/2008 | Soerli et al. |
| 7,518,953 | B2 | 4/2009 | Hegna et al. |
| 2002/0172094 | A1 | 11/2002 | McCall et al. |
| 2003/0121734 | A1* | 7/2003 | Staltmeir ................... 188/73.31 |
| 2004/0032794 | A1 | 2/2004 | Clayton et al. |
| 2004/0228214 | A1* | 11/2004 | Tulett ............................... 367/15 |
| 2006/0021609 | A1 | 2/2006 | Jensen |
| 2006/0050614 | A1 | 3/2006 | Hopperstad et al. |
| 2007/0000718 | A1* | 1/2007 | Sawano et al. ................. 180/446 |
| 2007/0115757 | A1 | 5/2007 | Soerli et al. |
| 2007/0153627 | A1 | 7/2007 | Tulett et al. |
| 2007/0263489 | A1 | 11/2007 | Vaage |
| 2008/0175102 | A1 | 7/2008 | Hegna et al. |
| 2008/0205191 | A1 | 8/2008 | Coste et al. |

FOREIGN PATENT DOCUMENTS

| | | |
|---|---|---|
| GB | 2394046 | 4/2004 |
| JP | 2000216713 | 8/2000 |
| WO | WO03079050 | 9/2003 |
| WO | WO2007143759 | 12/2007 |

OTHER PUBLICATIONS

Real Time Systems, "LongShot Seismic Source Controller," available on the Internet (World Wide Web) on or about Oct. 15, 2008 (2 pages).

Real Time Systems, "BigShot Seismic Source Controller," available on the Internet (World Wide Web) on or about Oct. 15, 2008 (2 pages).

Real Time Systems, "HotShot Seismic Source Synchronizer," available on the Internet (World Wide Web) on or about Oct. 15, 2008 (2 pages).

Real Time Systems, "BSHYD BigShot Hydrophone Digitizer," available on the Internet (World Wide Web) on or about Oct. 15, 2008 (1 page).

Real Time Systems, "GCS Link Seismic Source Remote Radio Link," available on the Internet (World Wide Web) on or about May 28, 2007 (1 page).

TRISOR, Advanced in-sea source controller and borehole seismic QC, © 2006 Schlumberger, 2 pages.

Notification Concerning Transmittal of International Preliminary Report on Patentability for International Application PCT/US2010/036423 mailed Dec. 8, 2011 (13 pages).

\* cited by examiner

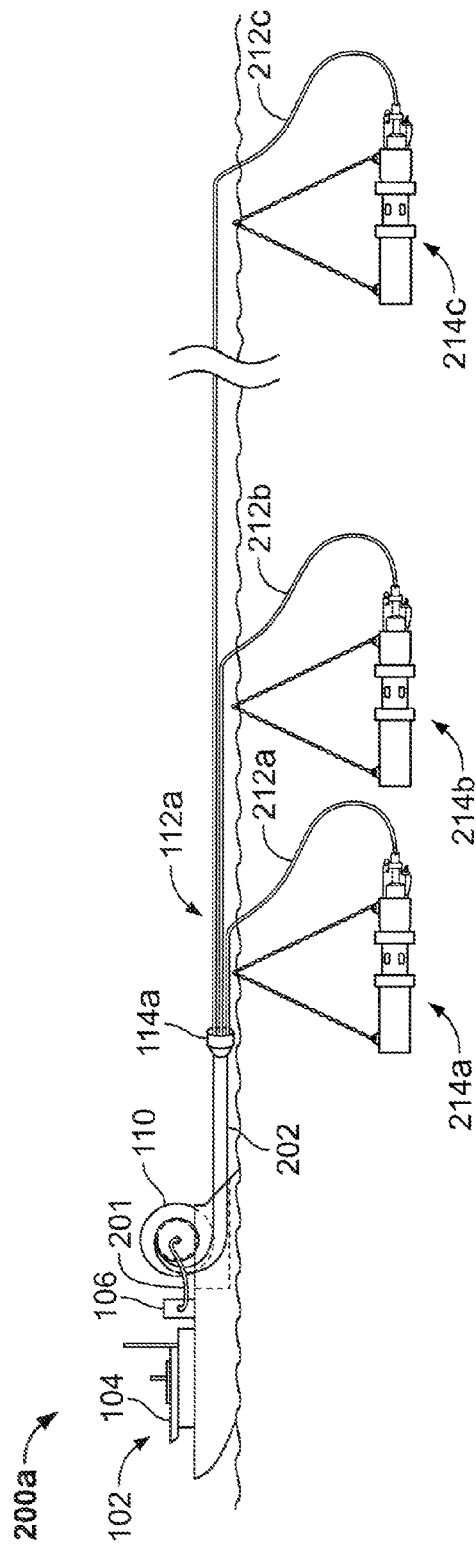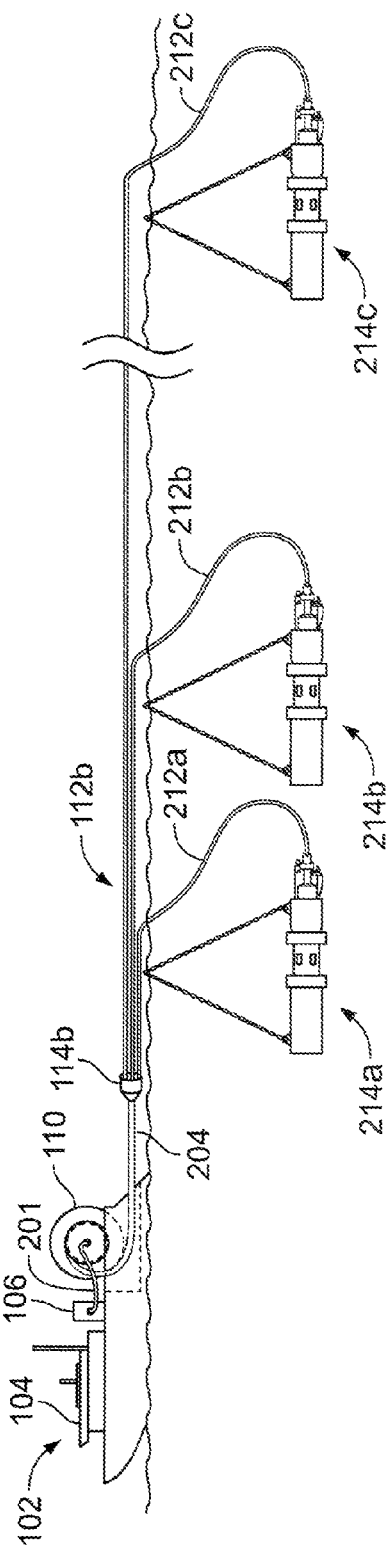

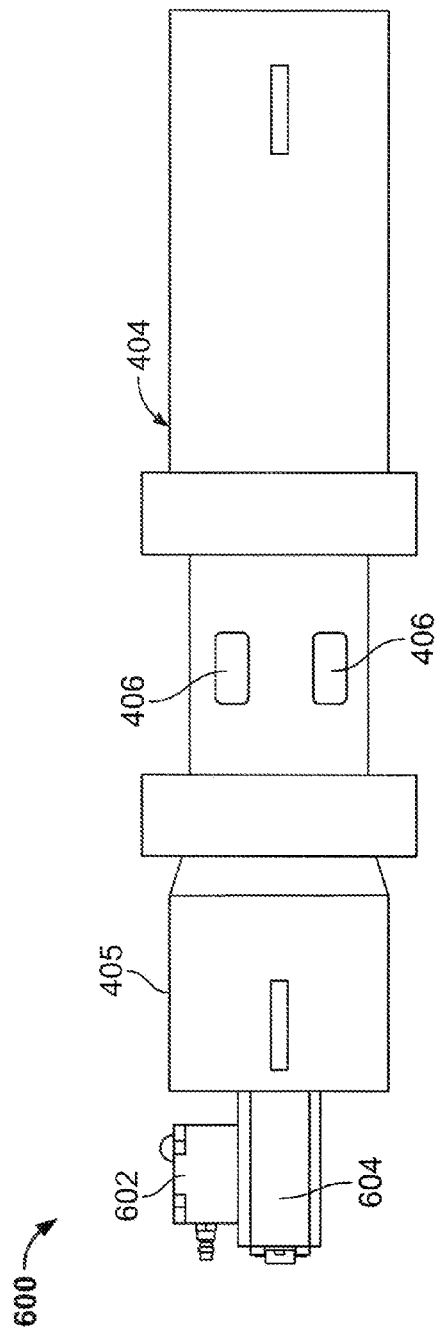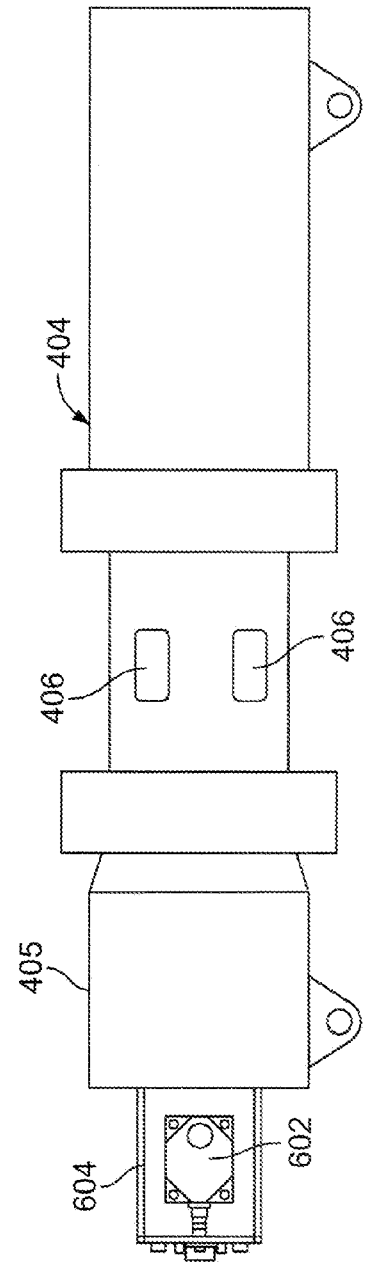

DIGITAL AIR GUN

CROSS-REFERENCE TO RELATED APPLICATIONS

This application claims the benefit of co-pending provisional application Ser. No. 61/217,204, filed May 28, 2009 and entitled "Marine Seismic Airgun with Internal Monitoring and Related Control Systems and Methods," the entire contents of which is incorporated herein by reference. This application incorporates by reference the entire contents of commonly owned international application number PCT/2010/036423, entitled "Digital Air Gun," concurrently filed with the U.S. Receiving Office under the Patent Cooperation Treaty.

BACKGROUND

Air guns are used as a source of seismic energy for marine seismic surveys. Air guns are typically deployed in an air gun array towed by a vessel. The air gun array can include several clusters of air guns, each submersed in water and suspended from a flotation device towed by the vessel. The vessel controls the air gun array to generate seismic source signals. To generate a seismic source signal the vessel fires the air guns in the array simultaneously, and the resulting seismic signal interacts with geological features beneath the ocean floor. Reflected seismic signals are collected and analyzed to identify properties of subsurface geological formations.

SUMMARY

In one general aspect, a marine air gun includes digital electronic circuitry. The digital electronic circuitry may control an actuator of the marine air gun, digitize and store data from sensors located on or near the marine air gun, send and/or receive digital communications, store and/or output electrical energy, and/or perform other functions.

In another general aspect, a marine seismic system includes a digital communication system. The digital communication system may include a separate digital communication link between a command center and each air gun cluster.

In some aspects, a marine air gun includes a pressure release assembly, an actuator, and a digital electronic controller. The pressure release assembly releases compressed air into water to generate an acoustic signal. The actuator moves to actuate the pressure release assembly in response to an electrical signal applied to the actuator. The actuator is carried by the pressure release assembly. The digital electronic controller controls the electrical signal applied to the actuator. The digital electronic controller is carried by the pressure release assembly.

Implementations may include one or more of the following features. The marine air gun includes one or more sensors carried by the pressure release assembly. The one or more sensors include a depth transducer, a pressure transducer, and/or a zero-field hydrophone. The digital electronic controller includes a digitizer that receives analog data from the one or more sensors and converts the analog data to digital data. The digital electronic controller includes a memory that stores the digital data. The marine air gun includes a communication interface carried by the pressure release assembly. The communication interface is configured to transmit the digitized data from the digital electronic controller to a central control system external the marine air gun. The communication interface is configured to receive digital communications from the central control system. The digital communications include commands that operate the digital electronic controller. The marine air gun includes a high voltage supply carried by the pressure release assembly. The high voltage supply is electrically coupled to the actuator by a switch. The digital electronic controller is communicably coupled to the switch to control the electrical signal applied to the actuator by the high voltage supply. The high voltage supply includes two capacitors each receiving an input voltage. The capacitors are connected in series to provide an output voltage twice the input voltage. One or both of the capacitors is an electrolytic capacitor. The marine air gun includes a circuit board carried by the pressure release assembly. The circuit board includes the digital electronic controller, a low voltage supply, a high voltage supply, and a communication interface. The actuator and the digital electronic controller reside in an actuator housing carried by a separate housing of the pressure release assembly. The actuator and/or the digital electronic controller reside in a chamber defined by a housing of the pressure release assembly. The pressure release assembly defines one or more ports and includes a pressure chamber that stores the compressed air. The pressure release assembly includes a partition that prevents fluid communication between the chamber and the one or more ports. Actuation of the pressure release assembly moves the partition to permit communication of the compressed air into the water from the chamber through the one or more ports. The actuator is a solenoid valve. A component of the solenoid valve moves to release a pneumatic signal in response to the electrical signal applied to the actuator. The pneumatic signal moves the partition to permit communication of the compressed air into the water from the chamber through the one or more ports.

In some aspects, a marine seismic system includes a sensor that detects conditions in or about a marine air gun submersed in water. The marine air gun includes a pressure release assembly that generates an acoustic signal. The marine air gun includes a digitizer that converts analog data from the sensor to digital data. The digitizer is carried by the pressure release assembly and communicably coupled to the sensor. The marine air gun includes a memory that stores the digital data. The memory is carried by the pressure release assembly and communicably coupled to the digitizer.

Implementations may include one or more of the following features. The sensor includes a zero-field hydrophone carried by the pressure release assembly. The zero-field hydrophone detects acoustic data in the water about the marine air gun. The sensor includes a near-field hydrophone spaced apart from the marine air gun. The near-field hydrophone detects acoustic data in the water about the marine air gun. The sensor includes a depth transducer carried by the pressure release assembly. The depth transducer detects a depth of the marine air gun below a surface of the water. The sensor includes a pressure transducer carried by the pressure release assembly. The pressure transducer detects an internal pressure in a chamber in the pressure release assembly. The sensor resides in a sensor housing carried by a housing of the pressure release assembly. A digital electronic controller that includes the digitizer and the memory reside in a controller housing carried by a housing of the pressure release assembly. The marine air gun includes a communication link between the sensor housing and the controller housing. A digital electronic controller includes the digitizer and the memory. The sensor and the digital electronic controller reside in a control housing carried by a housing of the pressure release assembly. The sensor is communicably coupled to the digital electronic controller by a soldered connection in the control housing.

The marine air gun includes a digital electronic controller that includes the digitizer and the memory. The marine air gun includes an actuator that moves to actuate the pressure release assembly in response to an electrical signal applied to the actuator. The digital electronic controller controls the electrical signal applied to the actuator. The digital electronic controller and the actuator reside in a control housing carried by the pressure release assembly.

In some aspects, a marine seismic system includes an array of marine air guns and a central control subsystem. Each of the marine air guns includes a digital electronic controller and/or one or more features described above. The central control subsystem is communicably coupled to the digital electronic controller of each marine air gun to send power and communications to the marine air gun.

Implementations may include one or more of the following features. The system includes communication links that communicably couple the central control subsystem to the marine air guns to transmit the power and communications. Each marine air gun includes a communication interface that communicably couples one of the communication links to the digital electronic controller. The system includes a multiplexer communicably coupled to the central control subsystem and the plurality of communication links. The multiplexer receives multiplexed signals from the central control subsystem, demultiplex the multiplexed signals, and sends the demultiplexed signals to the marine air guns through the communication links. The multiplexer may also receive signals from the marine air guns, multiplex the multiplexed signals, and send the multiplexed signals to the central control subsystem. The array includes multiple air gun clusters. Each of the air gun clusters includes one or two of the marine air guns. Each communication link provides communication and power from the central control subsystem to a single cluster. Each marine air gun includes a communication interface configured to transmit digital data from the digital electronic controller of the marine air gun to the central control subsystem. The communication interface is carried by the pressure release assembly. The central control subsystem resides on a marine vessel that tows the array.

In some aspects, a marine seismic system includes multiple air gun clusters and a central control subsystem. Each air gun cluster includes one or more marine air guns that generate acoustic signals in water based on digital communications from the central control subsystem. The central control subsystem is communicably coupled to the air gun clusters by multiple communication links. Each of the communication links is communicably coupled to one of the air gun clusters to transmit the digital communications from the central control subsystem to the air gun cluster.

Implementations may include one or more of the following features. The communication link for each air gun cluster is a single twisted pair and/or multiple twisted pairs. Each marine air gun cluster is configured for bidirectional communication with the central control subsystem over the single twisted pair and/or over multiple twisted pairs. The communication link for each air gun cluster is a fiber optic link. Each marine air gun includes a digital electronic controller. The digital communications include commands transmitted from the central control subsystem to the digital electronic controller. Each air gun includes a sensor. The digital communications include data collected by the sensor and transmitted from the marine air gun to the central control subsystem.

In some aspects, communicating digital data in a marine seismic system includes sending an outgoing digital communication to a marine air gun by modulating voltage on a communication link that couples the marine air gun to a central control subsystem. An incoming digital communication from the marine air gun is detected based on current modulations on the communication link. The incoming digital communication is stored in a memory of the central control subsystem.

Implementations may include one or more of the following features. The incoming digital communication includes digital data collected by sensors at the marine air gun. The outgoing digital communication includes digital command signals that control operation of the marine air gun. The communication link includes a first conductive wire and a second conductive wire. Modulating voltage on the communication link includes switching between a first voltage state and a second voltage state. In the first voltage state, the first conductive wire is electrically coupled to a high voltage source and the second conductive wire is electrically coupled to a ground reference voltage. In the second voltage state, the second conductive wire is electrically coupled to the high voltage source and the first conductive wire is electrically coupled to the ground reference voltage. The high voltage source includes a 40 Volt direct current voltage source, and the ground reference voltage is 0 Volts. Detecting an incoming digital communication from the air gun based on current modulations on the communication link includes converting changes in current on the communication link to binary voltage signals. A change in current is converted to a binary voltage signal by outputting a first voltage state based on detecting an increase in the current on the communication link and/or outputting a second voltage state based on detecting a decrease in the current on the communication link.

In some aspects, communicating digital data in a marine seismic system includes sending an outgoing digital communication from a marine air gun by modulating current on a communication link that couples the marine air gun to a central control subsystem. An incoming digital communication is detected from the central control subsystem based on voltage modulations on the communication link. The incoming digital communication is stored in a memory of the marine air gun.

Implementations may include one or more of the following features. The outgoing digital communication includes digital data collected by sensors at the marine air gun and the incoming digital communication includes digital command signals that control operation of the marine air gun. Modulating current on the communication link includes toggling an electrical coupling between the communication link and a ground reference voltage. The electrical coupling includes a switch and a resistor connected in series between the communication link and the ground reference voltage. Toggling the electrical coupling includes changing the switch between a conductive state and a non-conductive state. Detecting an incoming digital communication from the central control subsystem based on voltage modulations on the communication link includes converting voltage differences on the communication link to binary voltage signal. A voltage difference is converted to a binary voltage signal by comparing a first voltage on a first conductor of the communication link and a second voltage on a second conductor of the communication link, outputting a first voltage state when the first voltage is higher than the second voltage, and/or outputting a second voltage state when the second voltage is higher than the first voltage. Electrical power is received from the communication link. The electrical power is used to operate electronic circuitry of the marine air gun. Receiving the electrical power includes receiving the electrical power concurrently with detecting the incoming digital communication.

In some aspects, a marine seismic system includes a communication link, a central control subsystem, and a marine air gun. The communication link transmits digital data between the central control subsystem and the marine air gun. The central control subsystem includes a voltage modulator coupled to the communication link to transmit voltage-modulated signals to the marine air gun. The marine air gun includes a current modulator coupled to the communication link to transmit current-modulated signals to the central control subsystem.

Implementations may include one or more of the following features. The voltage-modulated signals and the current-modulated signals each include asynchronous and/or synchronous digital communications. The communication link is a twisted pair. The system includes additional air guns and additional communication links. Each additional air gun includes a current modulator coupled to one of the additional communication links to transmit current-modulated signals to the central control subsystem. The central control subsystem includes additional voltage modulators each coupled to one of the additional communication links to transmit voltage-modulated signals to one of the air guns. The marine air gun includes a comparator that converts the voltage-modulated signals to binary data, and the marine air gun includes a memory that stores the binary data. The central control subsystem includes a set-reset device that converts the current-modulated signals to binary data, and the central control subsystem includes a memory that stores the binary data. The voltage modulator includes an H-bridge. The current modulator includes a transistor.

In some aspects, a marine air gun includes an actuation device, a solenoid, a solenoid housing, and a transducer housing. The transducer housing may be bolted onto the solenoid housing. The solenoid may be housed and contained within a sealed space formed by and between the solenoid housing and the transducer housing. The marine air gun may include circuitry for controlling the solenoid. The circuitry may include one or more circuit boards with electronics mounted thereon for data acquisition, control and communication. Some or all of the electronics may be mounted with predominantly surface mount connections. One or more of the boards may be potted in place within the sealed space with a resin having elastic properties. The circuitry may include a pressure sensor mounted inside the sealed space for sensing the internal pressure of the air gun. The circuitry may include a connector on the solenoid housing which is used to connect to all control and quality control operations of the air gun. The circuitry may include a water depth sensor and a zero-field hydrophone housed within the transducer housing. The circuitry may include a connection of the air gun electronics to an air gun string network that allows multiplexed multiple air guns on a single communications line. The circuitry may include a connection to an external air gun timing sensor mounted outside the solenoid and attached to the air gun. The circuitry may be connected to receive signals from the pressure sensor and adapted to measure internal air pressure of the air gun. The circuitry may enable detecting of air leaks from the sealed space. Circuitry may be adapted to synchronize the air gun based on the internal air gun air pressure. The depth and/or zero-field hydrophone sensor detection may be added or removed from the air gun without adding additional connectors exposed to the water. All sensors and actuation control functions for an air gun may be connected using only one in-water connection at the air gun. In some aspects, the digital control wires for an air gun are isolated from the other air guns in order to improve reliability and fault finding operations. The air gun may be connected to a digital control network, for example, to reduce the number of wires going to the seismic vessel. The air gun may include a connector or adaptor all types of air guns using the optional external air gun timing sensor connection.

These and other aspects may be implemented as methods, systems, devices, computer program products, or otherwise. Some aspects may include and/or utilize instructions tangibly stored on a computer readable medium and/or instructions tangibly encoded in digital logic. Such instructions may be operable to cause a digital electronic controller to perform the operations and/or functionality described. Digital electronic controllers may include digital logic circuitry, digital microcontrollers and/or programmable processors. Some digital electronic controllers may run on software, while others may operate independent of software.

These and other aspects may provide one or more of the following advantages. An air gun cluster may be implemented with fewer external connectors exposed to the water. A marine air gun may be actuated, synchronized and/or monitored more accurately and/or more reliably. A seismic source system may be operated with fewer or less frequent electronic, mechanical, and/or pneumatic errors. Difficulties in troubleshooting electronic, mechanical, and/or pneumatic faults may be reduced. Data acquisition may be improved. The internal pressure in the pressure chamber of the pressure release assembly may be detected, which may improve leak detection and/or overall control and/or synchronization of the marine air guns. Air guns, communication links, and/or other components may be more reliably or easily interchangeable. A smaller umbilical may carry the communication links that provide point-to-point communication with each air gun cluster. The air gun array may be deployed a greater distance from the vessel towing the array. Hardware and/or processes for digital communications between the air gun and the command center may be simplified. The weight and/or drag of various system components may be reduced.

The details of one or more implementations are set forth in the accompanying drawings and the description below. Other features will be apparent from the description and drawings, and from the claims.

DESCRIPTION OF DRAWINGS

FIGS. 2A and 2B are schematic diagrams showing example marine seismic source systems.

FIGS. 6A and 6B are diagrams showing an example marine air gun.

Like reference symbols in the various drawings indicate like elements.

DETAILED DESCRIPTION

Figure 1:
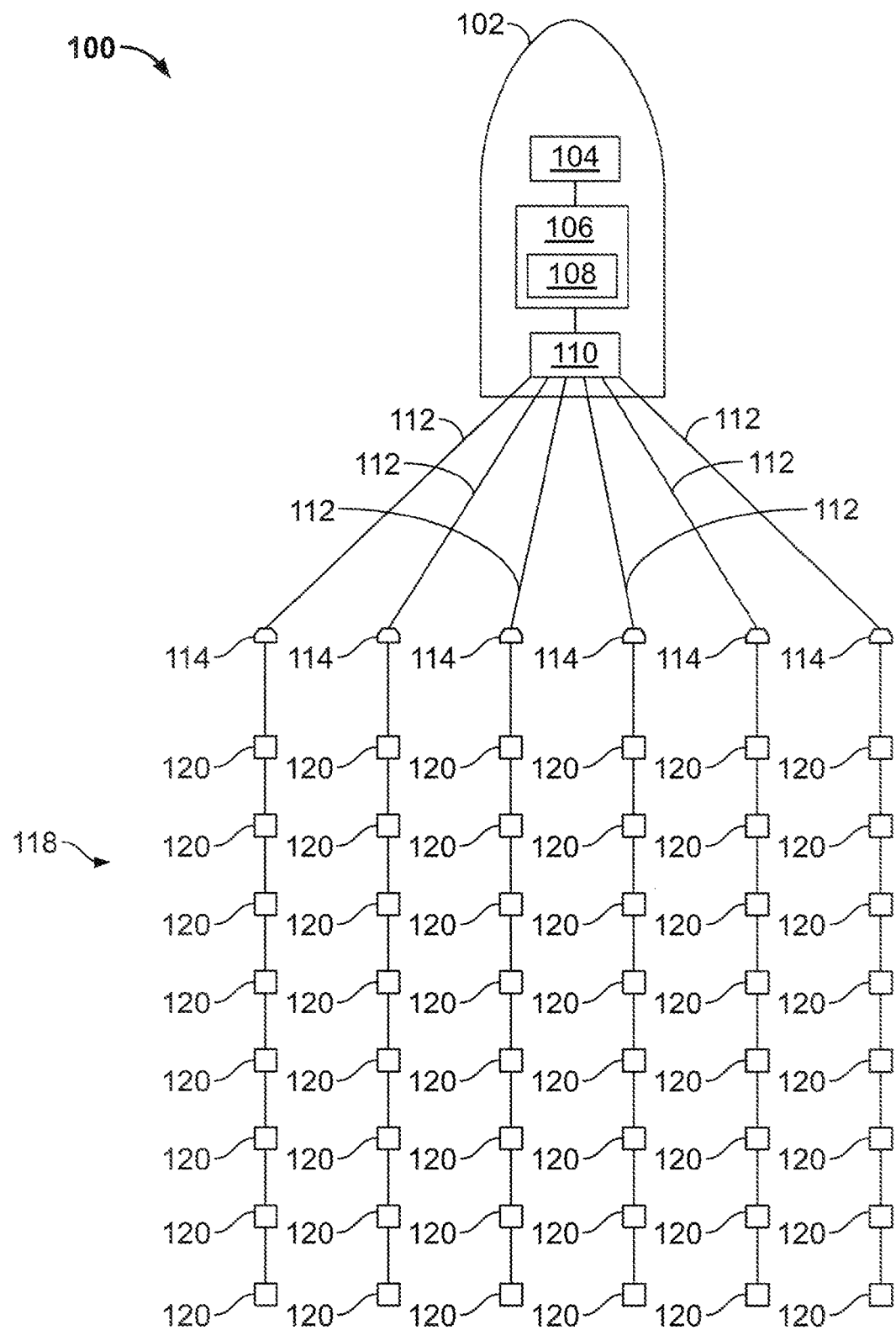
FIG. 1 is a block diagram showing an example marine seismic source system.

FIG. 1 is a block diagram showing an example marine seismic source system 100. The example system includes an array 118 of air guns clusters 120 towed by a vessel 102. Each cluster 120 may include one, two, three, or more marine air guns that generate an acoustic signal in the water. Different clusters may include different numbers of air guns. For example, some of the clusters 120 may each have a single air gun, while other clusters 120 may each include two or three air guns.

Each air gun houses its own digital electronic control circuitry. The electronic circuitry for an air gun may be carried in a sealed chamber defined by structures integral with the air gun body, structures attached to the air gun body, structures mounted on the air gun body, structures abutting the air gun body, and/or structures otherwise carried by the air gun body. In the example system 100, each air gun also houses transducers (e.g., depth transducers, pressure transducers, hydrophones, etc.) communicably coupled to the air gun's digital electronic circuitry. The digital electronic circuitry of each marine air gun can control operation of the marine air gun based on digital communications received from a command center 106, and/or the digital electronic circuitry can collect data from the transducers. The digital electronic circuitry may digitize the data, store the data, and/or transmit the digital data back to the command center 106.

In some implementations, a dedicated point-to-point communication link between each marine air gun cluster 120 and the command center 106 allows the command center 106 to exchange digital communications with each marine air gun individually. For example, each marine air gun may transmit digital data to the command center 106 by modulating current on the dedicated communication link, and/or the command center 106 may transmit digital data to each marine air gun by modulating voltage on the dedicated communication link.

The electronic circuitry embedded in the marine air gun can tolerate the harsh working conditions of the marine air gun. For example, in a some seismic surveys, the marine air gun is submersed in salt water or fresh water, subject to marine turbulence, and jolted by seismic signals from the marine air gun. In some instances, the electronic components experience forces over one thousand times the force of gravity when the marine air gun generates the acoustic signal. The robust configuration of the electronics may sustain such conditions for reliable and continuous operation through several seismic surveys without interruption. In some cases, all or part of the electronic circuitry are integrated in one or more circuit boards or similar structures, and the integrated structure is secured in a chamber of the air gun by shock-absorbing material. The shock-absorbing material may have elastic properties that reduce wear or damage to the electronic circuitry components. Example shock-absorbing material include gels, epoxies, resins, potting materials, and others.

The electronic circuitry may be spatially compact to allow all or part of the electronic circuitry to be integrated directly into a housing of the air gun actuator (e.g., the solenoid valve housing), a sensor housing (e.g., the pressure transducer housing, etc.), or a different structure of the marine air gun. For example, the digital electronic circuitry can be integrated on a single circuit board that fits in a solenoid housing. By integrating the electronic circuitry into a common housing with an actuator or sensor of the marine air gun, the circuitry can communicably couple to the actuator or sensor without external connectors exposed to the water. For example, the electronic circuitry components can be electrically connected to the actuators and sensors of the marine air gun by surface-mount soldered connections within a common sealed chamber, which may reduce the number of external connectors. In addition to reducing exposure to water, the surface-mount soldered connections may provide a mechanically and electrically robust coupling among the electronic components and/or between the electronic components and the other air gun components (e.g., the solenoid, transducers, etc.).

In the example system 100, the vessel 102 tows an array 118 of air gun clusters 120. The vessel 102 includes a navigation center 104, a command center 106, and one or more reels 110. The vessel 102 may include an air supply (not shown) that provides pressurized air to the air guns in the array 118. An air supply may include a cylinder or chamber that store gas at high pressure, a pump that pressurize the gas, regulators that control gas pressure, valves that control gas flow, and/or other features. The pressurized air provided to the air guns is stored in one or more chambers in the pressure release assembly of the air gun and released by the pressure release assembly to generate the acoustic signal. The pressurized air may also be stored in one or more chambers in an actuator of the air gun and released by the actuator to actuate the pressure release assembly.

The pressurized or compressed air used by a marine seismic source system and/or by components of a marine seismic source system may include any type of compressible fluid. For example, the air supply on the vessel 102 may include supplies of helium, nitrogen, oxygen, carbon dioxide, argon, or any combination of these and/or other gases. For example, the compressed air communicated to the marine air guns and released by the marine air guns to generate the acoustic signal may include one or more of these example gases in any ratio or combination. Some marine air guns may also generate an acoustic signal by releasing non-compressible fluid. For example, in some instances a marine air gun releases water to generate an acoustic signal in water.

The vessel 102 may include a power supply that generates electrical power for operating one or more components of the system 100. A power supply may include a DC voltage supply that provides a constant voltage, an AC voltage supply that provides a time-varying voltage, and/or other types of power supply. The vessel 102 may include additional and/or different features. In some implementations, the system 100 operates in accordance with one or more operations of the process 1200 shown in FIG. 12. In some implementations, the system 100 operates in a different manner.

Each air gun cluster 120 is coupled to an umbilical 112 extending from the reels 110. The umbilical 112 includes communication links supporting communications between the command center 106 and the air guns at each clusters 120. Each umbilical 112 includes a bell housing 114. The bell housing 114 may include a multiplexer that multiplexes and/or demultiplexes communications to and/or from the command center 106. The multiplexer may be mounted internal to the bell housing 114, external to the bell housing 114, and/or in another location.

The navigation center 104 navigates the vessel 102. The navigation center 104 may navigate the vessel 102 based on automated and/or manual control. For example, the navigation center 104 may be programmed to guide the vessel 102 through a trajectory specified for one or more seismic surveys. During a seismic survey, the navigation center 104 may navigate based on data stored locally on the vessel 102, based on global positioning system (GPS) data received by the vessel 102, based on data received wirelessly (e.g., via satellite, via radio frequency transmission, and/or another medium) from a remote location, and/or based on other types of information.

The navigation center 104 may communicate with the command center 106. For example, the navigation center 104 may send the command center 106 instructions to fire the air gun array 118, and/or the command center 106 may send the navigation center 104 information relating to the status of the air gun array 118 (e.g., location information, firing status information, etc.), which may include information relating to individual clusters 120, information relating to individual air guns in the array 118, and/or information relating to the array 118 as a whole.

The command center 106 operates the array 118 based on digital communications with the air guns in each cluster 120. The command center 106 includes a communication interface 108 that transmits digital data to and receives digital data from the air guns in the array 118. The command center 106 may include additional and/or different features. The command center 106 may include a computer system, for example, that includes processors running software for performing some or all of the functionality of the command center. The computer system may include memory that can store data received from and/or relating to operations of the air guns. The computer system may include display devices (e.g., monitors, etc.) that can display the data in various formats and/or user interface devices (e.g., keyboard, mouse, etc.) that receive user input. Generally, the command center 106 may receive, store, analyze, generate, and/or transmit data relating to the air gun array 118 and/or data relating to other aspects of a seismic survey. In some instances, some or all of the command center 106 computing operations and functionality may be performed at a remote location. The command center 106 may include a power supply that provides electrical power provided to the air gun array 118. The power supply may supply electrical energy at one or more voltage levels (e.g., 5 Volts, 10 Volts, 20 Volts, 40 Volts, 80 Volts, etc.). The command center 106 may control the level of electrical voltage and/or power provided to each air gun cluster 120.

The communication interface 108 transmits electrical power and commands and/or other information to the air gun(s) at each clusters 120. The commands may be based on data received from the navigation center 104, data stored or generated locally by the command center 106, data received from a remote location (e.g., remote from the vessel 102), and/or other data. The commands sent to the air guns may include various types of instructions for conducting a seismic survey. For example, the commands may include a fire command, instructions to prepare for a fire command, commands to reconfigure an air supply valve, requests for data, and/or other types of commands. The commands and/or other information sent from the communication interface 108 may be addressed to all air guns, to individual air guns, to individual air gun clusters 120, and/or to subsets of air guns. For example, the communication interface 108 may address a command to an individual air gun by transmitting an identifier with the command (e.g., as a header), where the identifier corresponds to the individual air gun. Each air gun may have a unique identifier. The commands may include digital communications in any digital communication format. For example, the digital communications may include asynchronous digital communications, synchronous digital communications, and/or other formats.

The communication interface 108 receives data and/or other types of information from the air gun(s) at each cluster 120. The data received from an air gun may include data collected by transducers at the air gun, data generated by a digital controller at the air gun, and/or other data. The data received from an air gun may include various types of data relating to a seismic survey. For example, the information may include data from a one or more transducers associated with the air gun, data from a GPS receiver associated with the air gun, data relating to an air supply and/or air supply valves, various types of quality control data, timing signals, ready signals, data requested by the command center 106 and/or other types of data. The information received by the communication interface 108 may include an identifier that corresponds to the individual air gun that sent the information. The data received by the communication interface may include digital communications in any digital communication format. For example, the digital communications may include asynchronous digital communications, synchronous digital communications, and/or other formats.

In the example system 100, the reels 110 control the positions of the air gun clusters 120 by controlling the deployed length of each umbilical 112. The communication links in each umbilical 112 are communicably coupled to the communication interface 108. The communication links may be directly coupled to the communication interface 108, or the communication links may be indirectly coupled to the communication interface 108 through a network and/or connectors, which may include one or more communication links.

In some implementations, each umbilical 112 includes a communication link for each cluster 120. In the example shown, each umbilical 112 may include eight communication links, where each of the communication links is communicably coupled to the communication interface 108 and air gun(s) in a cluster 120. Each umbilical 112 may include one or more additional communication links. For example, each umbilical may include one or more backup communication links that can be used for troubleshooting purposes, backup purposes, supplemental communication and/or for communications with devices other than the air guns. In the example system, the communication link for each cluster 120 also provides electrical energy that powers the electronics at the cluster 120. In some implementations, each umbilical 112 may include a separate power link that provides power to the cluster 120 independent of communications. Each umbilical 112 may include an air supply line that provides pressurized air from an air supply on the vessel 102 to each air gun. Each umbilical 112 may include additional and/or different features. In some cases, the umbilical 112 does not include air supply, and one or more air supply lines run from the vessel 102 to each air gun cluster 120 separate from the umbilical 112.

In some implementations, each umbilical 112 includes a multiplexer at the bell housing 114 and a multiplexed communication link between the multiplexer and the communication interface 108. In such implementations, the communication interface 108 may also include a multiplexer that combines communications for multiple air gun clusters 120 onto a single multiplexed communication link. The multiplexer at the bell housing 114 on the umbilical 112 can demultiplex the data from the multiplexed link onto the separate communication links for each air gun cluster 120. As such, point-to-point communications between the command center 106 and each air gun cluster 120 may include multiplexed links that each support communication between the command center 106 and multiple air gun clusters 120 and dedicated (i.e., non-multiplexed) links that each support communications between the command center and an individual air gun cluster 120.

FIGS. 2A and 2B are diagrams showing example marine seismic source systems 200a, 200b. Although either system 200a, 200b may include an array having several strings of air gun clusters, only a single string is shown in each of FIGS. 2A and 2B. Three example air gun clusters 214a, 214b, 214c are shown, and each air gun cluster is shown as having a single air gun. Each of the systems 200a, 200b may include strings of air guns having greater or fewer than three clusters, and each cluster may include more than one air gun.

The example system 200a of FIG. 2A includes dedicated communication links for each air gun cluster. The umbilical 112a in FIG. 2A includes individual communication links 212a, 212b, 212c for each air gun cluster 214a, 214b, 214c. A first communication link 212a provides communications between the command center 106 and the first air gun cluster 214a; a second communication link 212b provides communications between the command center 106 and the second air gun cluster 214b; and a third communication link 212c provides communications between the command center 106 and the second air gun cluster 214c. Each communication link 212a, 212b, 212c extends from the reel 110 to an air gun cluster. As such, each communication link 212a, 212b, 212c extends through the portion 202 of the umbilical 112 nearest the vessel 102 (between the bell housing 114a and the reel 110), and the bell housing 114a does not utilize a multiplexer. In some implementations, each communication link 212a, 212b, 212c extends from the reel 110 to the command center 106. In some implementations, one or more different communication links 201 (which may or may not include a multiplexed link) communicably couples the communication links 212a, 212b, 212c to the command center 106 from the reel 110.

The example system 200b of FIG. 2B also includes dedicated communication links for each air gun cluster. As in FIG. 2A, the umbilical 112b in FIG. 2B includes individual communication links 212a, 212b, 212c for each air gun cluster 214a, 214b, 214c. The umbilical 112b in FIG. 2B includes a multiplexed link 204 between the reel 110 and the bell housing 114b. As such, each communication link 212a, 212b, 212c extends only between the bell housing 114b and one of the air gun clusters. The bell housing 114b includes a multiplexer that performs multiplexing and demultiplexing operations for converting data between the dedicated communication links 212a, 212b, 212c and the multiplexed link 204. In some implementations, multiplexed link 204 extends from the reel 110 to the command center 106. In some implementations, one or more different communication links 201 (which may or may not include a multiplexed link) communicably couples the multiplexed link 204 to the command center 106 from the reel 110.

Figure 3A:
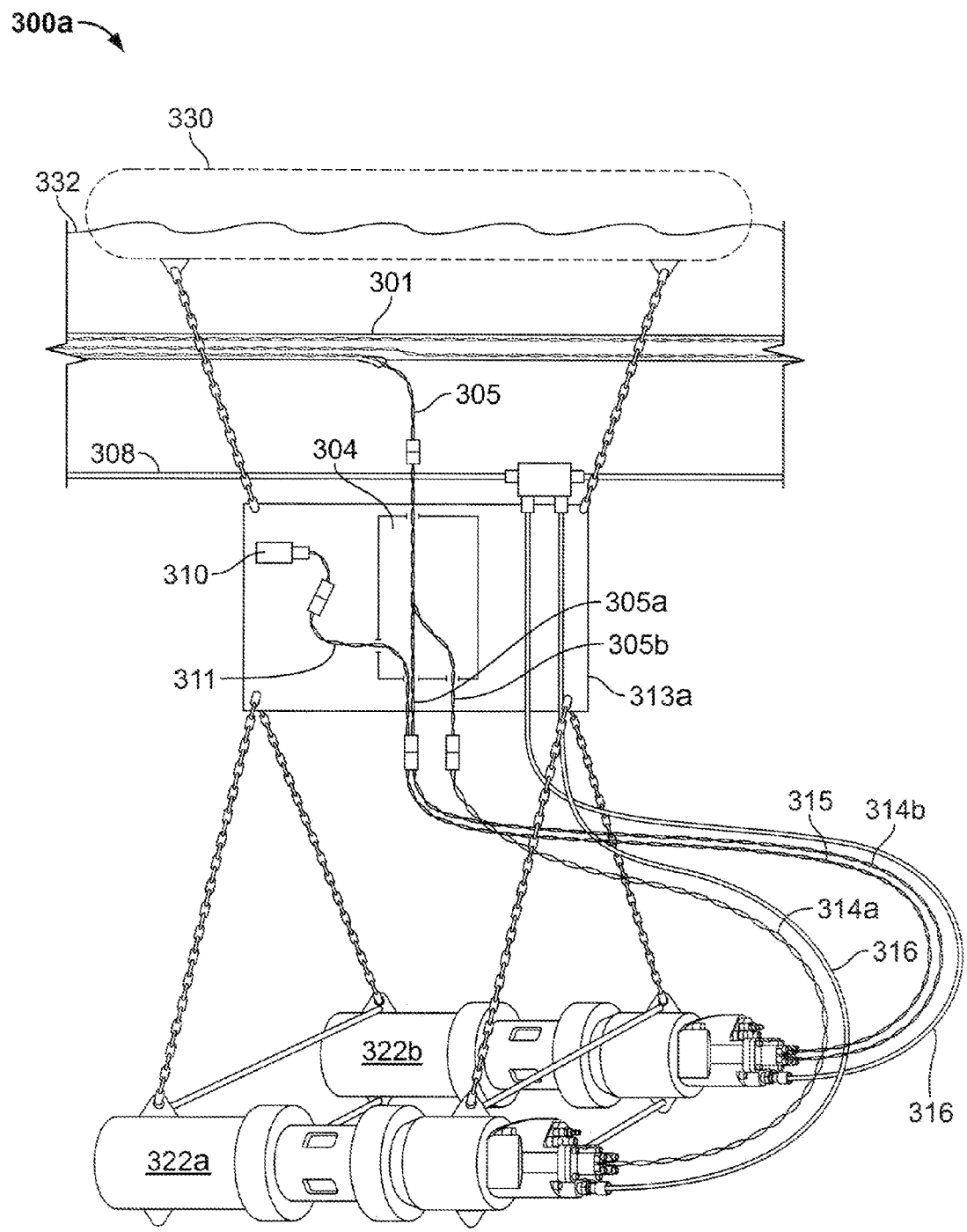
FIGS. 3A and 3B are diagrams showing example air gun clusters.
Figure 3B:
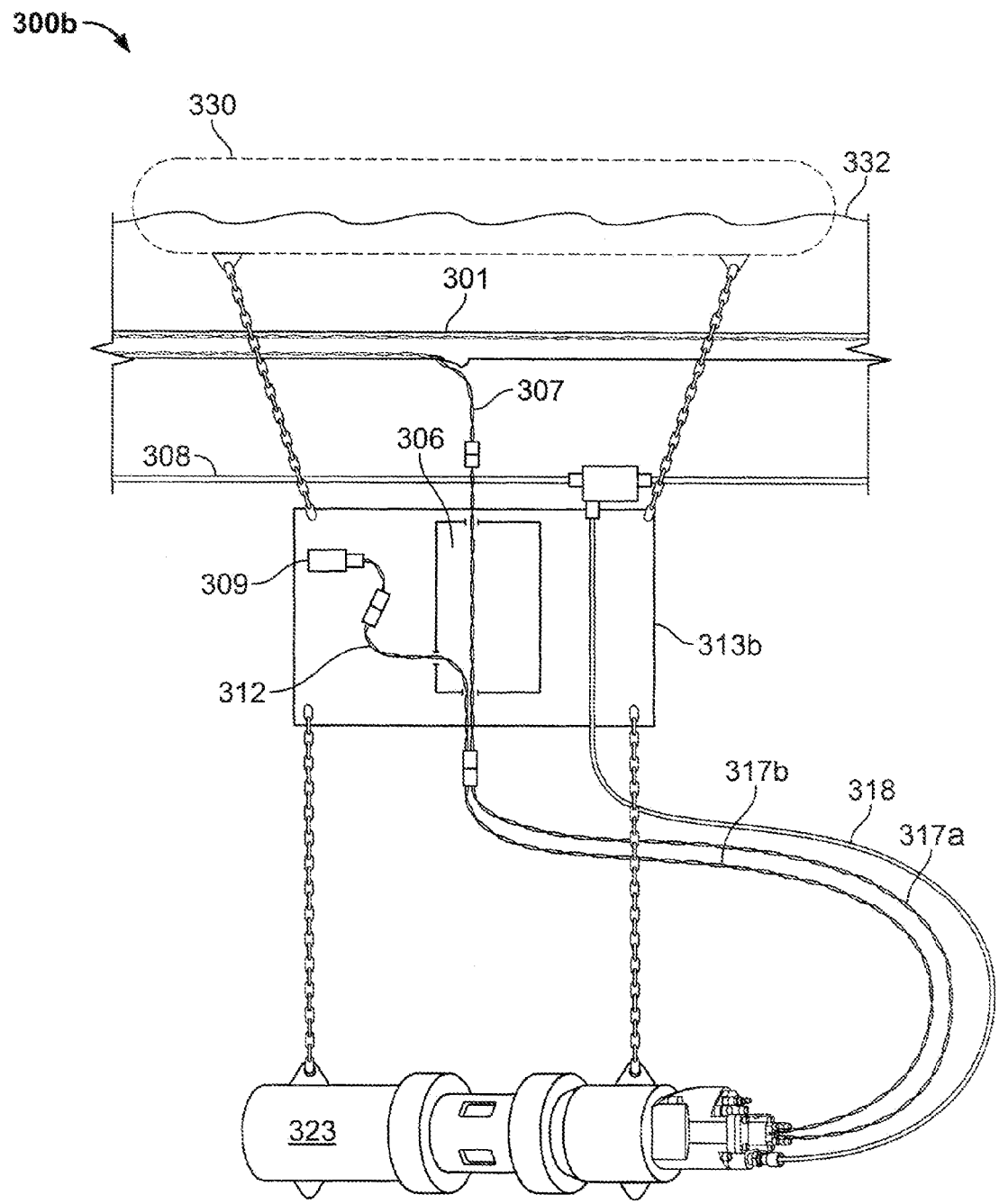

FIGS. 3A and 3B are diagrams showing example air gun clusters. The air gun clusters may be towed by a vessel (not shown). FIG. 3A shows an example cluster 300a with two marine air guns 322a, 322b. FIG. 3B shows an example cluster 300b with one marine air gun 323. In some implementations, a cluster may include more than two air guns. In some implementations, each of the clusters 120 of FIG. 1 can be implemented as the cluster 300a, the cluster 300b, and/or another type of air gun cluster. In some implementations, the systems 200a, 200b of FIG. 2 can include one or more of the clusters 300a, 300b, and/or different types of air gun clusters.

The cluster 300a shown in FIG. 3A includes a hanger plate 313a submersed in water, the two air guns 322a, 322b submersed in water, and a flotation device 330 at the water surface 332. The cluster 300a may include additional and/or different features. The flotation device 330 floats at the water surface 332 and suspends that hanger plate 313a. The hanger plate 313a suspends the air guns 322a, 322b at a depth below the hanger plate 313a. Chains, cables, and/or other suitable structures may be used to suspend the hanger plate 313a and/or the air guns 322a, 322b at a desired depth. For example, the air guns 322a, 322b may be deployed at a depth of twenty feet, thirty feet, or another depth below the water surface 332. The components of the cluster 300a may be arranged in a different configuration. In some instances, the air guns 322a, 322b may be suspended from the floatation device 330, and the hanger plate 313a can be suspended from the air guns 322a, 322b at a depth below the air guns 322a, 322b. The air guns 322a, 322b may be suspended at the same depth below the water surface 332 or at different depths.

Two air supply lines 316 extend from a main air supply line 308 to the hanger plate 313a. Each of the air supply lines 316 extends from the hanger plate 313a to one of the air guns 322a, 322b. The air supply lines 316 provide pressurized air to the air guns. The hanger plate 313a and/or the air guns 322a, 322b may include one or more valves (not shown) that control the flow of air through the supply lines 316. The main air supply line 308 may provide pressurized air to one or more additional clusters in an air gun array. The main air supply line 308 may receive air from an air supply on a vessel that tows the cluster 300a.

The air guns 322a, 322b receive the pressurized air from the air supply lines 316 and store the air at high pressure in a chamber in the air gun. When actuated by an actuator (e.g., a solenoid valve), a pressure release assembly of each air gun 322a, 322b can release the compressed air to generate an acoustic signal in the water. The actuator (e.g., a solenoid valve) of the air guns 322a, 322b may also receive the pressurized air from the air supply lines 316 and store the air at high pressure in a chamber of the actuator. The actuator can use the compressed air to pneumatically actuate the pressure release assembly in response to an electrical signal (e.g., a voltage signal) received by the actuator. Digital electronic circuitry housed at each air gun 322a, 322b may control the electrical signal applied to the actuator of the air gun to control the pressure release. The digital control electronics at each air gun 322a, 322b may control the air gun based on digital communications received from a command center (e.g., the command center 106 of FIG. 1).

The cluster 300a includes several communication links 305, 305a, 305b, 311, 314a, 314b, 315 and others. The communication links 305, 305a, 305b, 314a, 314b, 315 may transmit digital communications from the command center to each air gun 322a, 322b and/or from each air gun 322a, 322b to the command center. In the example shown, each of the communication links 305, 305a, 305b, 311, 314a, 314b, 315, is implemented as a single twisted pair. A twisted pair includes a pair of conducting wires that are twisted around each other along all or part of the length of the conducting wires. Additional and/or different types of communication link may be used. For example, one or more of the communication links 305, 305a, 305b, 311, 314a, 314b, 315 may include one or more twisted pairs, fiber optic cables, coaxial cables, and/or different types of communication links.

The communication link 305 provides power and communications to the cluster 300a and transmits data from the cluster 300a. The communication link 305 extends to the hanger plate 313a from an umbilical 301. The umbilical 301 extends to one or more additional clusters in an air gun array. In addition to the communication link 305, the umbilical 301 includes additional communication links that provide power and communications to the other clusters in an air gun array. Each additional communication link in the umbilical 301 may be implemented with a twisted pair and/or with additional or different types of communication links. The umbilical 301 may extend to a vessel that tows the cluster 300a and/or to a bell housing towed behind the vessel.

The hanger plate 313a includes a splitter 304. The splitter 304 splits the signal from the communication link 305 into two communication links 305a, 305b. The communication links 305a, 305b may each receive identical signals from the communication link 305 through the splitter 304. When the air guns 322a, 322b transmit data, the splitter 304 transfers signals from the communication links 305a, 305b to the communication link 305. The communication links 305a, 305b are communicably coupled (e.g., by a connector or another type of coupling) to the communication links 314a, 314b, which each extend through the water to one of the air guns 322a, 322b. The cluster 300a may include additional, different, or fewer communication links. For example, in some implementations, the communication links 305a, 305b may extend through the water to the air guns 322a, 322b without coupling to communication links 314a, 314b.

The air gun 322a houses digital electronic circuitry communicably coupled to the communication link 314a, and the air gun 322b houses digital electronic circuitry communicably coupled to the communication link 314b. The digital electronic circuitry in each air gun 322a, 322b may be housed in a structure that is integral with, mounted on, and/or otherwise carried by the pressure release assembly of the air gun. The digital electronic circuitry at each air gun 322a, 322b may control operation of the air gun, for example, by electrically controlling an mechanical or pneumatic actuator that actuates the pressure release assembly. The digital electronic circuitry at each air gun 322a, 322b may control operation of the air gun based on digital communications received at the air gun from the command center (e.g., the command center 106 of FIG. 1).

Each air gun 322a, 322b may also house transducers communicably coupled to the digital electronic circuitry communicably in the air gun. The transducers in each air gun 322a, 322b may be housed in a structure that is integral with, mounted on, and/or otherwise carried by the pressure release assembly of the air gun. The transducers may include pressure transducers, depth transducers, a zero-field hydrophone, and/or other types of transducers. The transducers may generate electrical signals based on detecting mechanical, acoustic, pneumatic, and/or other types of conditions in or about the air gun. The transducers may transmit analog data to the digital electronic circuitry housed at the air gun, and the digital electronic circuitry may digitize and store the data. The digital electronic circuitry in the air guns may transmit the digitized transducer data to the command center through the respective communication links 314a, 314b, 305a, 305b, and 305.

Each air gun 322a, 322b includes connectors that couple to the communication links and to the pressurized air supply lines. The connectors may include electrical couplings, optical couplings, mechanical couplings, pneumatic couplings, and/or other types of couplings. For example, the connectors may include bolts, screws, threading, and/or other types of fasteners that mechanically secure an external cable, wire, tube, conduit, or other type of structure to the connector. As another example, the connectors may include copper and/or other types of metallic fittings that provide conductive coupling for power and/or communications. As another example, the connectors may include sealed pneumatic fittings for the pressurized air supply line.

The hanger plate 313a includes a near field hydrophone 310. The near-field hydrophone 310 collects acoustic data. The near-field hydrophone may be positioned equidistant (or substantially equidistant) from the two air guns 322a, 322b, such that when the air guns 322a, 322b are fired they appear acoustically to the near-field hydrophone 310 as a point source. The near-field hydrophone 310 includes an acoustic transducer that converts acoustic signals to electrical signals. In the example shown, the near-field hydrophone 310 is communicably coupled to the digital electronic circuitry in the air gun 322a by a first communication link 311 in the hanger plate 313a and a second communication link 315 that extends between the hanger plate 313a and the air gun 322a. The near-field hydrophone 310 may transmit analog data to the air gun over the communication links 311, 315, and the digital electronic circuitry in the air gun 322a may digitize and store the data from the near-field hydrophone 310. The digital electronic circuitry in the air gun 322a may transmit the digitized near-field hydrophone data to the command center through the communication links 314a, 305a, and 305. Data from the near-field hydrophone 310 may be useful for data analysis, quality control, and/or trouble shooting. For example, data from the near-field hydrophone 310 may indicate the magnitude, frequency, duration, timing, and/or other properties of the seismic signal generated by the cluster 300a. In some instances, data from the near-field hydrophone 310 may be used to detect air leaks in the supply lines and/or in the air guns in the cluster 300a.

In addition to the near-field hydrophone 310, the hanger plate 313a and/or a different structure in the cluster 300a may include auxiliary devices that receive power and/or communications from the communication link 305. For example, the cluster 300a may include a GPS device, air supply valves, and/or other types of auxiliary devices that receive power and/or communications from the communication link 305.

The cluster 300b shown in FIG. 3B includes a hanger plate 313b submersed in water, the air guns 323 submersed in water, and a flotation device 330 at the water surface 332. The cluster 300b may include additional and/or different features. The flotation device 330 floats at the water surface 332 and suspends that hangar plate 313b. The hanger plate 313b suspends the air gun 323 at a depth below the hanger plate 313b. Chains, cables, and/or other suitable structures may be used to suspend the hanger plate 313b and/or the air gun 323. The components of the cluster 300a may be arranged in a different configuration. In some instances, the air gun 323 may be suspended from the floatation device 330, and the hanger plate 313b can be suspended from the air gun 323 at a depth below the air gun 323.

An air supply line 318 extends from the main air supply line 308 to the hanger plate 313b and from the hanger plate 313b to the air gun 323. The air supply line 318 provides pressurized air to the air gun 323. The hanger plate 313b and/or the air gun 323 may include one or more valves (not shown) that control the flow of air through the supply line 318. The air gun 323 may be configured and/or operate in the same manner as the air gun 322a of the cluster 300a in FIG. 3A. For example, the air gun 323 can receive the pressurized air from the air supply line 318, store the air at high pressure in a chamber in the air gun 323, and release the compressed air to generate an acoustic signal in the water. The air gun 323 may include the same actuator, digital electronics, and transducers as the air gun 322a in FIG. 3A, which may operate as described with respect to the air gun 322a.

The cluster 300b includes several communication links 307, 317a, 317b, and others. The communication links 307 and 317a may transmit digital communications from the command center to the air gun 323 and/or from the air gun 323 to the command center. In the example shown, each of the communication links 307, 317a, 317b is implemented as a single twisted pair. Additional and/or different types of communication link may be used. The communication link 307 provides power and communications to the cluster 300b and transmits data from the cluster 300b. The communication link 307 extends to the hanger plate 313b from an umbilical 301.

The hanger plate 313b may include a splitter 304. The communication link 306 is communicably coupled (e.g., by a connector or another type of coupling) to the communication link 317a, which extends through the water to the air gun 323. The cluster 300b may include additional, different, or fewer communication links. For example, in some implementations, the communication link 307 may extend through the water to the air gun 323 without coupling to communication link 317a.

The hanger plate 313b includes a near-field hydrophone 309. The near-field hydrophone 309 may be configured and/or operate as the near-field hydrophone 310 of FIG. 3A. In the example shown in FIG. 3B, the near-field hydrophone 309 is communicably coupled to the digital electronic circuitry in the air gun 323 by a first communication link 312 in the hanger plate 313b and a second communication link 317b that extends between the hanger plate 313b and the air gun 323. The digital electronic circuitry in the air gun 323 may receive analog data from the near-field hydrophone 309, digitize the data, store the digitized data, and transmit the digitized data to the command center through the communication links 317a, 307.

Figure 4A:
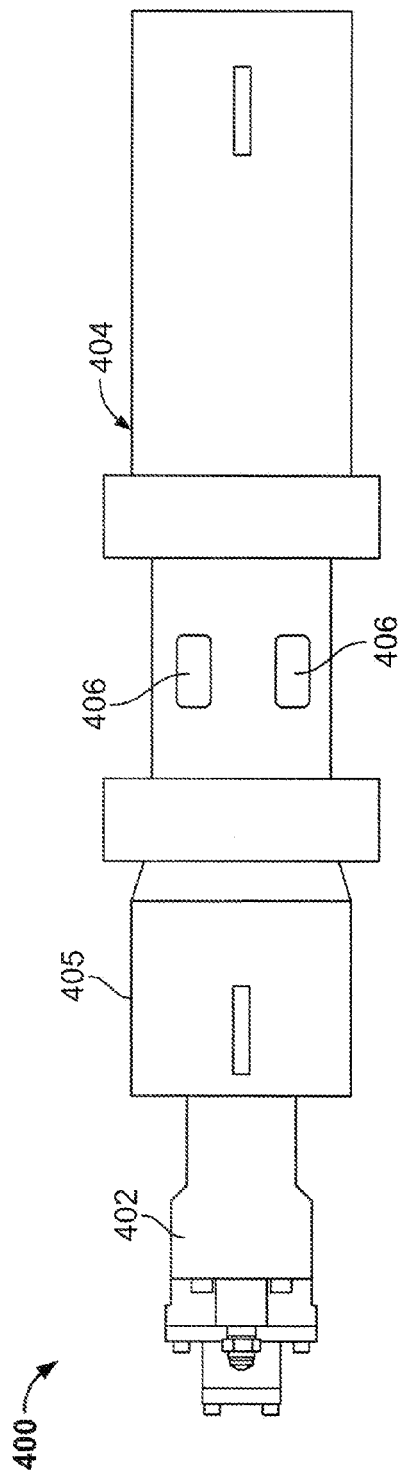
FIGS. 4A and 4B are diagrams showing an example marine air gun.
Figure 4B:
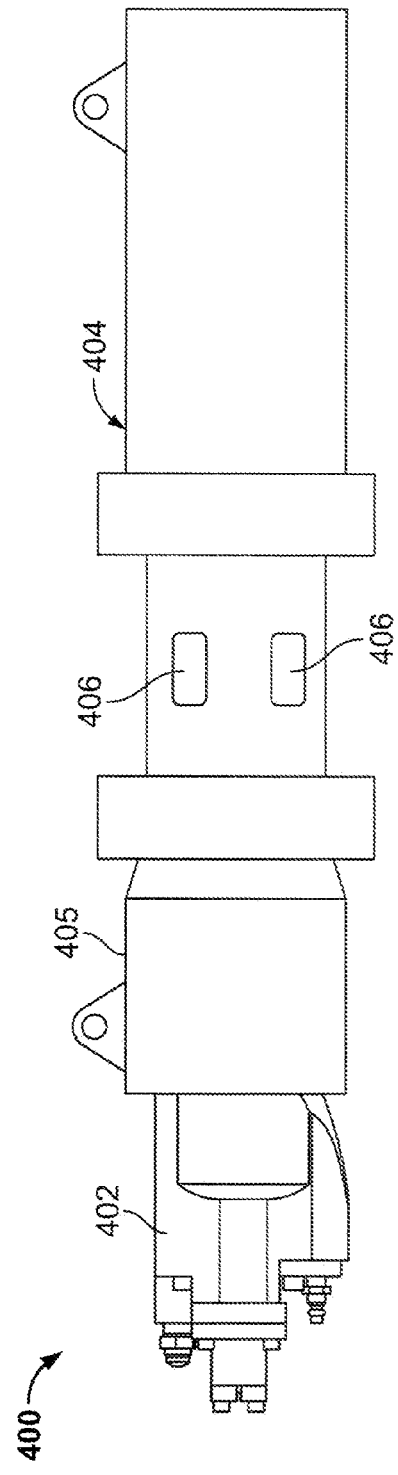
Figure 8A:
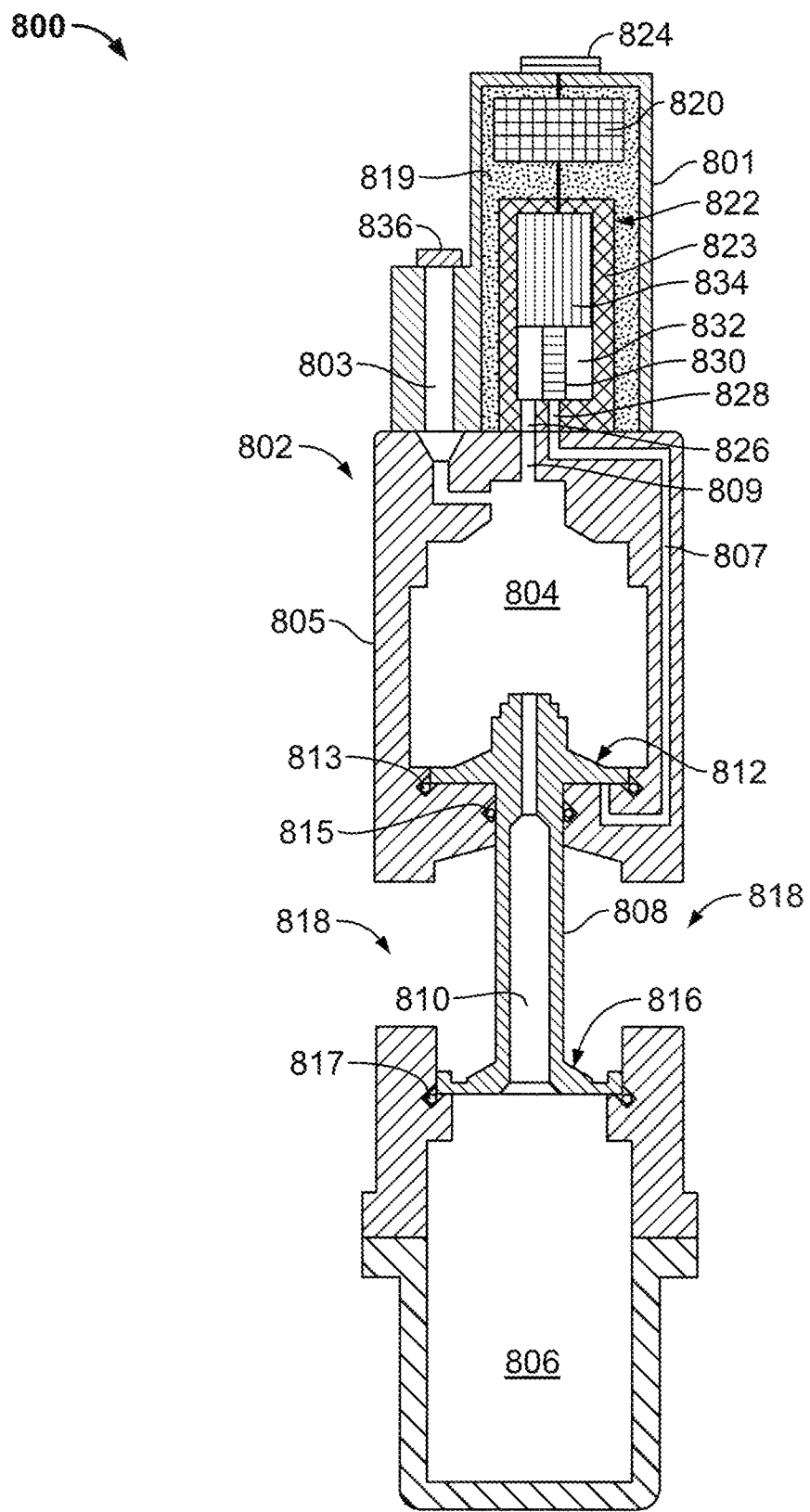
FIGS. 8A and 8B are schematic diagrams showing an example marine air gun.
Figure 8B:
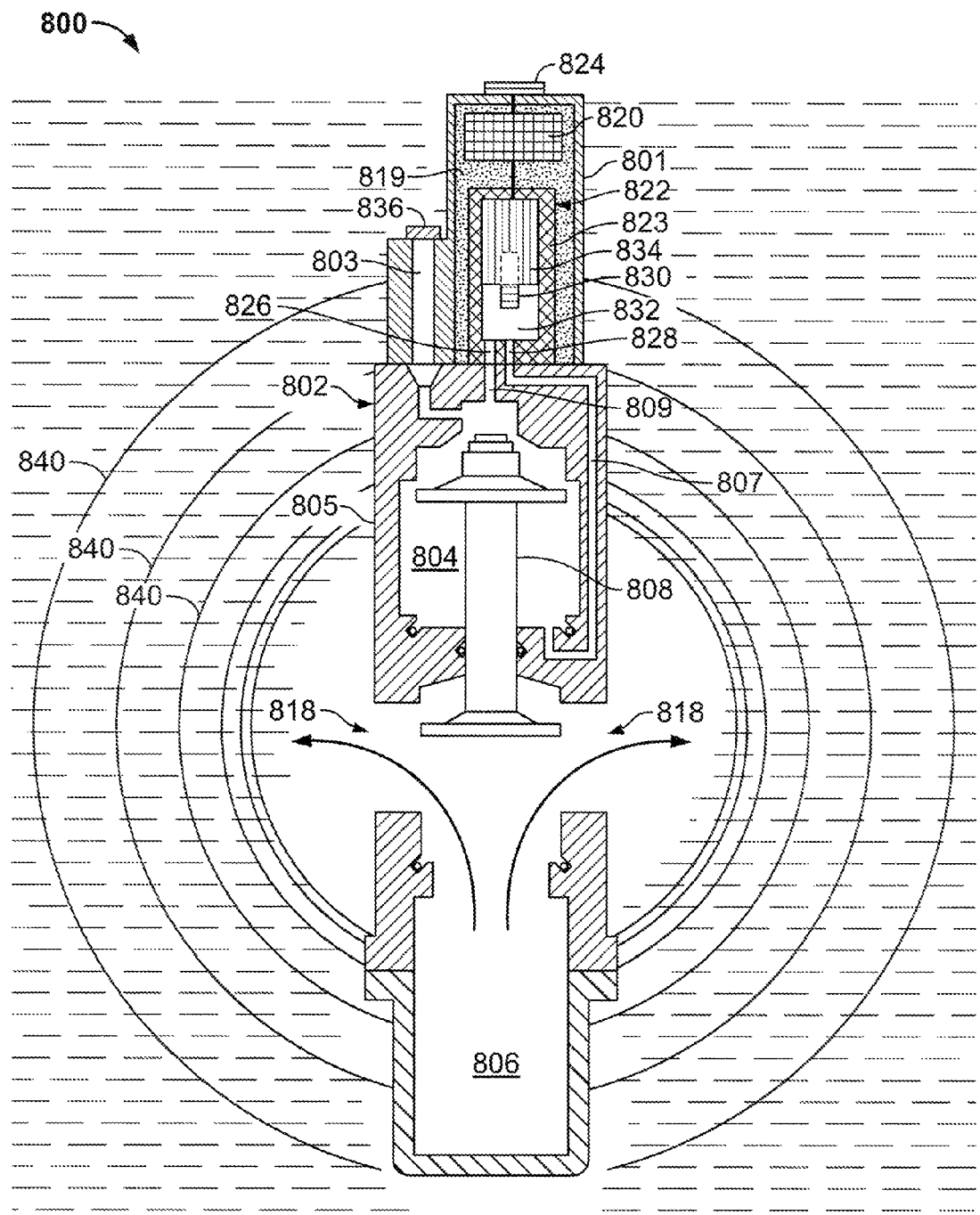

FIGS. 4A and 4B are diagrams showing an example marine air gun 400. In some implementations, the marine air guns 322a, 322b of FIG. 3A and/or the marine air gun 323 of FIG. 3B may be implemented as the marine air gun 400. The marine air gun 400 includes a pressure release assembly 404 and a control housing 402 carried on the end of the pressure release assembly 404. The pressure release assembly 404 includes a housing 405 that defines ports 406. Within the housing 405, the pressure release assembly 404 defines a pressure chamber that stores compressed air. The pressure release assembly 404 includes a partition that prevents fluid communication between the pressure chamber and the ports 406. The partition is moveable to permit fluid communication between the pressure chamber and the ports 406. The partition may be part of a valve, a piston, or another type of structure that moves the partition when the pressure release assembly is actuated. The surge of compressed fluid from the pressure chamber through the ports 510 generates an acoustic signal that propagates through the water. FIGS. 8A and 8B show features of an example pressure release assembly. The pressure release assembly 404 may include features that are the same as or similar to the features of the example pressure release assembly 802 of FIGS. 8A and 8B. The air gun 400 may include a different type of pressure release assembly, for example, that includes different features and/or operates in a different manner than the pressure release assembly 802 of FIGS. 8A and 8B.

Figure 4C:
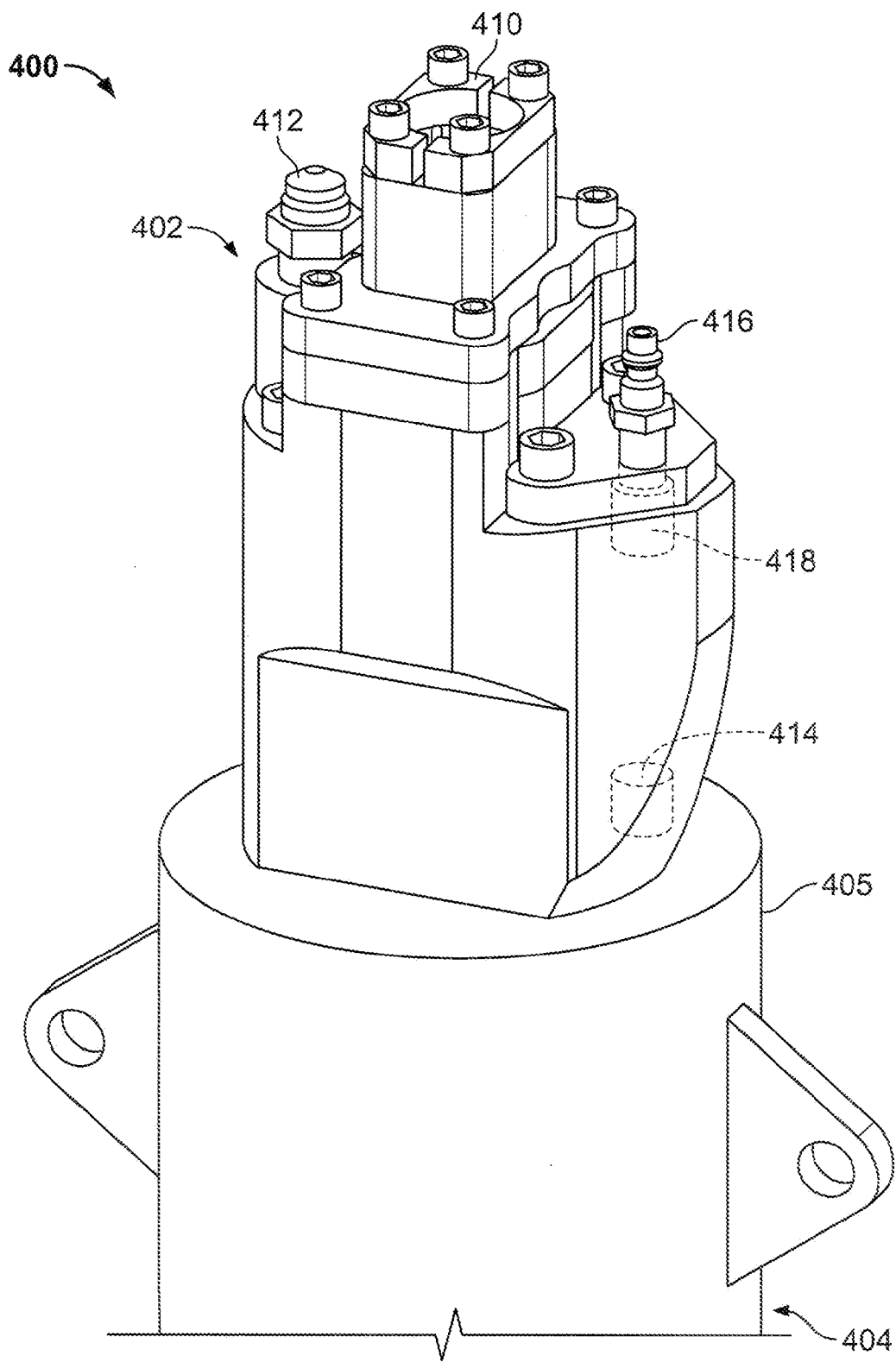
FIGS. 4C and 4D are diagrams showing aspects of the example marine air gun 400 of FIGS. 4A and 4B.
Figure 4D:
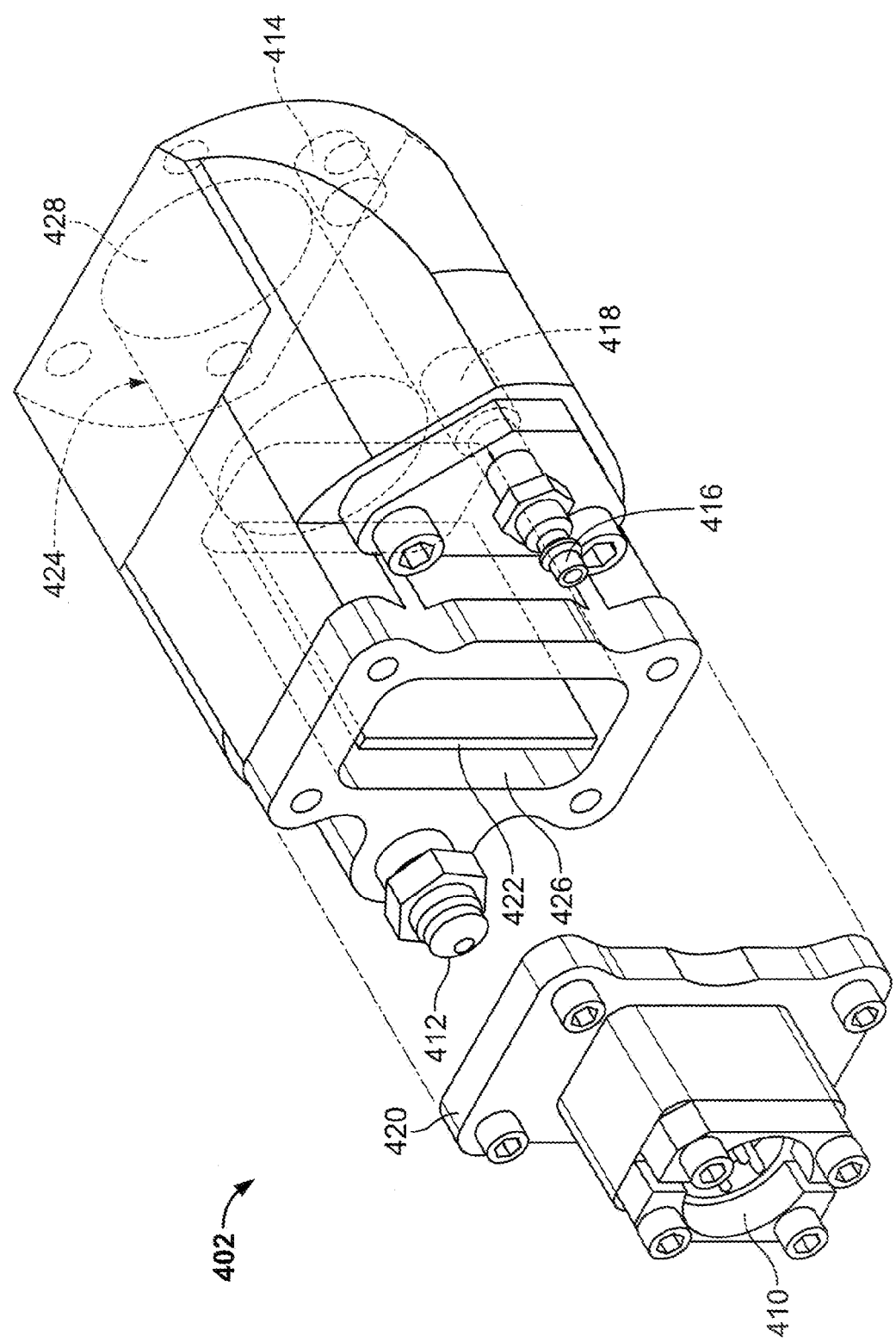

FIG. 4C is a perspective view of the end of the air gun 400 that carries the control housing 402, and FIG. 4D is an exploded view of the control housing 402. The control housing 402 may be integral with the housing 405 and/or another component of the pressure release assembly 404. The control housing 402 may be a separate structure from the pressure release assembly 404. The control housing 402 may be bolted, welded, or otherwise mechanically attached to the housing 405 and/or another component of the pressure release assembly 404. The control housing 402 includes a cap plate 420 that can be bolted or otherwise secured to a body of the control housing 402. The control housing 402 may be modified and/or adapted for different types of pressure release assemblies. The control housing 402 may be modified for different types of communication interfaces, air supply lines, power supply sources, and/or other features external to the air gun 400.

The control housing 402 includes connectors that couple the air gun 400 to one or more communication links, one or more power supplies, one or more pressurized air supplies, and/or other resources. The control housing 402 includes a communication link connector 410 that couples the air gun 400 to a communication link external to the air gun 400. For example, the communication link connector 410 may couple to the communication link 315 of FIG. 3A, to one or both of the communication links 314a, 314b of FIG. 3A, to one or both of the communication links 317a, 317b of FIG. 3B, and/or to another type of communication link. The communication link connector 410 may communicably couple the external communication link to digital electronic circuitry in the control housing 402. For example, the communication link connector 410 may communicably couple an external communication link to a communication interface and/or a digital electronic controller in the control housing. As another example, the communication link connector 410 may communicably couple an external communication link to one or more power supply modules in the control housing 402. In the example shown, the communication link connector 410 provides all external electrical connections for the air gun 400 in a single external connector. In some implementations, additional external connectors may be used.

The control housing 402 includes a pressurized air supply connector 412 that couples the air gun 400 to a pressurized air supply external to the air gun 400. For example, the air supply connector 412 may couple to one of the supply lines 316 of FIG. 3A, the supply line 318 of FIG. 3B, and/or another type of air supply line. The air supply connector 412 may provide pressurized air to the pressure release assembly 404, to an actuator in the control housing 402, and/or to other components of the air gun 400.

The control housing 402 includes a pressure sensor 414 and a depth sensor 418. In the example shown, the pressure sensor 414 abuts the pressure release assembly 404. The pressure sensor 414 may be pneumatically coupled to a pressure chamber in the pressure release assembly 404, which may allow the pressure sensor 414 to monitor the internal pressure of the air gun 400. For example, the pressure sensor 414 can measure the internal pressure in the pressure chamber of the pressure release assembly 404. The pressure sensor 414 may monitor the internal pressure while the air gun 400 fires and/or while the chamber pressurizes before and/or after the air gun 400 fires. The pressure sensor 414 includes a transducer that converts pressure to electrical signals. Analog data from the pressure sensor 414 can be digitized, stored, and/or transmitted from the air gun 400 by digital electronic circuitry on the control board 422. Information from the pressure sensor 414 may be useful for data analysis, quality control, and/or trouble shooting. Such information may indicate the magnitude, frequency, duration, timing, and/or other properties of the seismic signal generated by the cluster 300a. For example, the pressure sensor 414 may provide data relating to when and/or how fast the pressure release assembly 404 releases the compressed air to generate the acoustic signal. Such data may be used to synchronize the air gun 400 with other air guns in an array. The pressure sensor 414 may provide data relating to the rate at which pressure builds in the pressure chamber. Such data may be used to diagnose air leaks and/or other problems that may occur during a marine seismic survey.

The control housing 402 includes a depth sensor 418 and a test air connector 416 for the depth sensor 418. The depth sensor 418 can detect the depth of the air gun 400 beneath the water surface. The depth sensor 418 includes a transducer that detects depth. For example, depth sensor 418 may include a pressure transducer that detects a pressure differential between the depth sensor 418 and the water surface, and converts the pressure differential to an electric signal. Analog data from the pressure sensor 414 can be digitized, stored, and/or transmitted from the air gun 400 by digital electronic circuitry on the control board 422. Data from the depth sensor 418 can be useful for seismic data analysis. For example, the depth sensor 418 may help identify the location of the air gun 400 when the air gun 400 is fired. The location of the air gun 400 when it fires indicates the origin of the seismic signal generated by the air gun 400, which may be used for processing the collected seismic data.

The control housing 402 may also include a zero-field hydrophone (not shown). The zero-field hydrophone may collect acoustic data in the immediate vicinity of the air gun 400. For example, the zero-field hydrophone may be attached to the air gun 400 and/or otherwise carried by the air gun 400. Data from the zero-field hydrophone may be collected in addition to or instead of data from a near-field hydrophone that is spaced apart from the air gun 400. Analog data from the pressure sensor 414 can be digitized, stored, and/or transmitted from the air gun 400 by digital electronic circuitry on the control board 422. Data from the zero-field hydrophone may be useful for data analysis, quality control, and/or trouble shooting. For example, data from the zero-field hydrophone 310 may indicate the magnitude, frequency, duration, timing, and/or other properties of the seismic signal generated by the air gun 400. In some instances, data from the zero-field hydrophone may be used to detect air leaks and/or other problems that may occur during a marine seismic survey.

The control housing 402 defines a cavity 428 for an actuator that actuates the pressure release assembly 404. The actuator may be initiated by an electrical signal applied to the actuator. The actuator may move in response to the electrical signal, and movement of the actuator may mechanically and/or pneumatically actuate the pressure release assembly 404. In the example shown, the actuator in the cavity 428 is a solenoid valve 424. The solenoid valve 424 may be a pressure balanced solenoid valve, an inertial solenoid valve, a combination of these, and/or another type of solenoid valve. FIGS. 8A and 8B show features of an example solenoid valve 822. The solenoid valve 424 may include features that are the same as or similar to the features of the example solenoid valve 822 of FIGS. 8A and 8B. The air gun 400 may include a different type of actuator, for example, that includes different features and/or operates in a different manner than the solenoid valve 822 of FIGS. 8A and 8B.

The control housing defines a cavity 426 for the electronics that control the air gun 400. The cavity 426 may be separate from or connected to the cavity 428. The cavities 426, 428, may form one or more sealed chambers in the control housing 402. Some or all of the electronics may be mounted on a control board 422 housed in the cavity 426. One control board 422 is shown in FIG. 4D. The control board can be a PC board and/or a different type of board. In some implementations, all of the electronic circuitry in the control housing 402 are mounted on the single control board 422. In some implementations, additional control boards may be used. The cavity 426 may also house one or more electronic components apart from the control board 422. For example, the cavity 426 may house one or more capacitors that are electrically coupled to, but not mounted on, the control board 422. The capacitors may be part of a high voltage supply that provides electrical power to the solenoid valve 424 to actuate the pressure release assembly 404. The electronic circuitry may include a digital controller, a digitizer, a digital memory, digital logic devices, resistors, inductors, capacitors, and/or other components. FIGS. 7, 10A, 10B, and 11 show example components and modules of the electronic circuitry that may be housed in the control housing 402.

The solenoid valve 424, the control board 422, one or more capacitors (not shown) and/or other components may be mounted in the control housing 402 to sustain the mechanical jerk, acceleration, and movement of the air gun 400 firing. For example, one or more of the components may be secured in the cavities 426, 428 of the air gun by shock-absorbing material. The shock-absorbing material may reduce wear or damage to the components. Example shock-absorbing materials include gels, epoxies, resins, potting materials, and others. Connections among the components within the control housing 402 may be soldered, welded, and/or otherwise mechanically robust connections. For example, a digital electronic processor may be communicably coupled to power supplies, a communication interface, and/or other components by soldered connections in a sealed chamber with the components. As another example, a power supply may be electrically coupled with the solenoid valve 424 by a soldered connection in a sealed chamber with the power supply and the solenoid valve 424. Soldered connections in a sealed chamber with the components that they connect may reduce the likelihood of wear or failure due to water exposure and/or mechanical stress and movement.

In some implementations, some or all of the electronic circuitry of the air gun 400 are carried by the air gun 400 outside of the control housing 402. For example, some or all of the electronic components may reside in a different housing that is integral with, attached to, mounted on, and/or otherwise carried by the pressure release assembly 404. FIGS. 6A and 6B are diagrams showing an example marine air gun 600 that includes the pressure release assembly 404, an actuator housing 604, and a separate controller housing 602. The actuator housing 604 and the controller housing 602 are both carried by the housing 405 of the pressure release assembly 404 in FIGS. 6A and 6B. The controller housing 602 is mounted to the actuator housing 604. For example, the controller housing 602 may be a separate structure mounted to the actuator housing 604 by a bolted, welded, or other type of mechanically robust mount. The controller housing 602 and the actuator housing 604 may each contain shock-absorbing material to protect the components in the housing. Each housing may define a sealed chamber that contains electrical and/or mechanical components that control operation of the air gun 600, and each housing may include soldered connections among the components.

Together, the controller housing 602 and the actuator housing 604 include the components of the control housing 402 of FIGS. 4A, 4B, 4C, and 4D. For example, the controller housing 602 may house some of the electronic circuitry contained in the cavity 426 of the control housing 402 shown in FIG. 4D, and the actuator housing 604 may house the actuator contained in the cavity 428 of the control housing 402 shown in FIG. 4D.

Figure 5A:
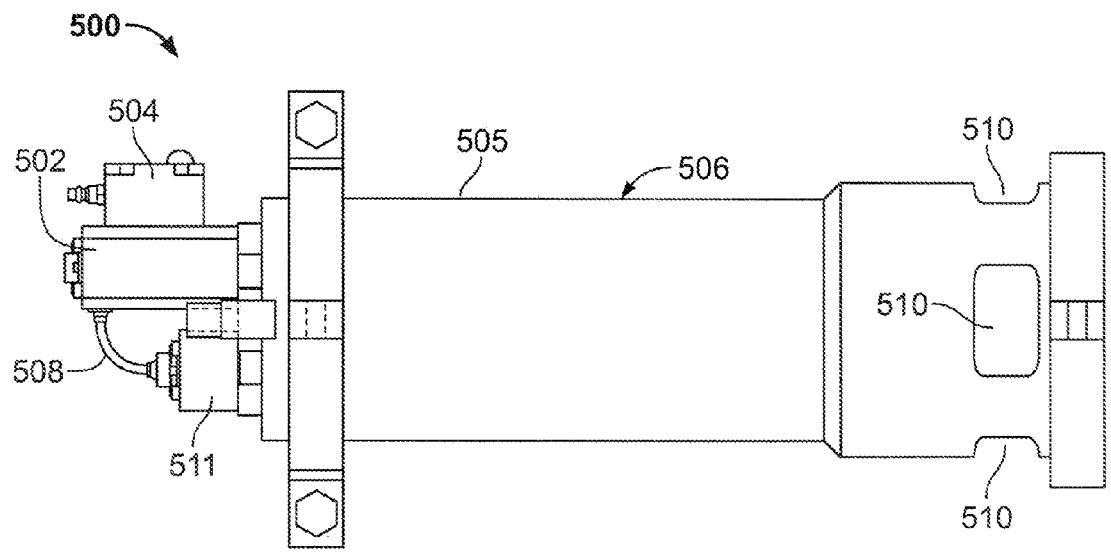
FIGS. 5A and 5B are diagrams showing an example marine air gun.
Figure 5B:
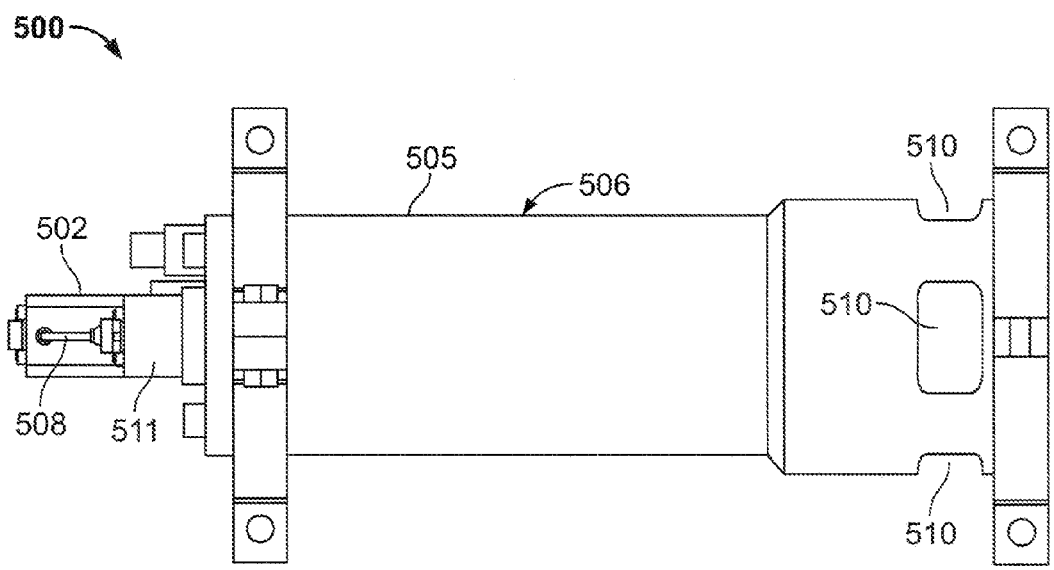
Figure 5C:
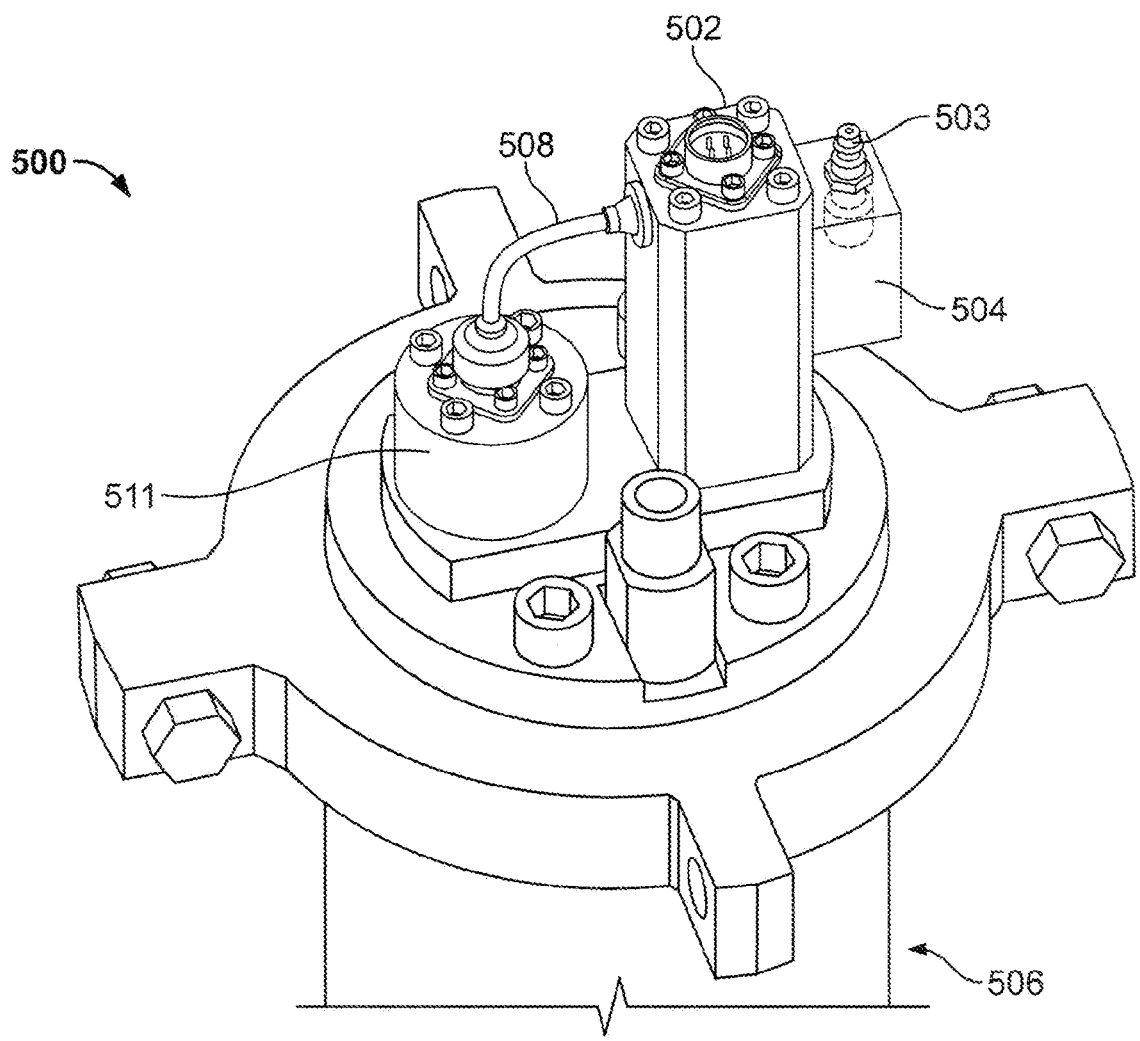
FIG. 5C is a diagram showing aspects of the example marine air gun 500 of FIGS. 5A and 5B.

FIGS. 5A and 5B are diagrams showing an example marine air gun 500. FIG. 5C is a perspective view of an end of the air gun 500. In some implementations, the marine air guns 322*a*, 322*b* of FIG. 3A and/or the marine air gun 323 of FIG. 3B may be implemented as the marine air gun 500. The marine air gun 500 includes a pressure release assembly 506 and three housings carried on the end of the pressure release assembly 506. As shown in FIG. 5A, the actuator housing 502 and the timing sensor housing 511 are each mounted on the housing 505 of the pressure release assembly 506, and the controller housing 504 is mounted on the actuator housing 502. In some implementations, one or more of the housings may be integral with another housing or structure of the air gun 500. Each housing may be a separate structure mounted to another housing by a bolted, welded, or other type of mechanically robust mount. Each housing may contain shock-absorbing material to protect the components in the housing from impact. Each housing may include soldered connections among components in the housing. Each housing may define a sealed chamber that contains electrical and/or mechanical components that control operation of the air gun 500.

The pressure release assembly 506 includes a housing 505 that defines ports 510. Within the housing 505, the pressure release assembly 506 defines a pressure chamber that stores compressed air. The pressure release assembly 506 includes a partition that prevents fluid communication between the pressure chamber and the ports 510. The partition is moveable to permit fluid communication between the pressure chamber and the ports 510. The surge of compressed fluid from the pressure chamber through the ports 510 generates an acoustic signal that propagates through the water.

The actuator housing 502 carries an actuator. For example, the actuator housing 502 may house a solenoid valve that actuates the pressure release assembly 506. The actuator housing 502 includes a communication link connector. The controller housing 504 houses the electronic circuitry. For example, the controller housing 504 may house a digital electronic controller, a memory, a communication interface, and/or other electronic components. FIGS. 7, 10A, 10B, and 11 show example components and modules of the electronic circuitry that may be housed in the controller housing 504. The controller housing 504 also includes a depth transducer 503 with an air supply fitting.

The timing sensor housing 511 houses a sensor that detects a pressure release event by the pressure release assembly 506. For example, the timing sensor housing 511 may include a pressure transducer that detects a change in pressure in or about the pressure release assembly 506, for example, when the pressure release assembly generates the acoustic signal. Data relating to the pressure release event may be digitized, stored, and/or transmitted by the digital electronic circuitry in the actuator housing and the controller housing 504. The timing of the pressure-release event may be analyzed to synchronize the firing of the air gun 500 with other air guns in the array. In the example shown, a connector on the timing sensor housing 511 is coupled to a connector on the actuator housing 502 by an external communication link 508. The link 508 may provide power and/or data communications between the components in the timing sensor housing 511 and the actuator housing 502.

Figure 7:
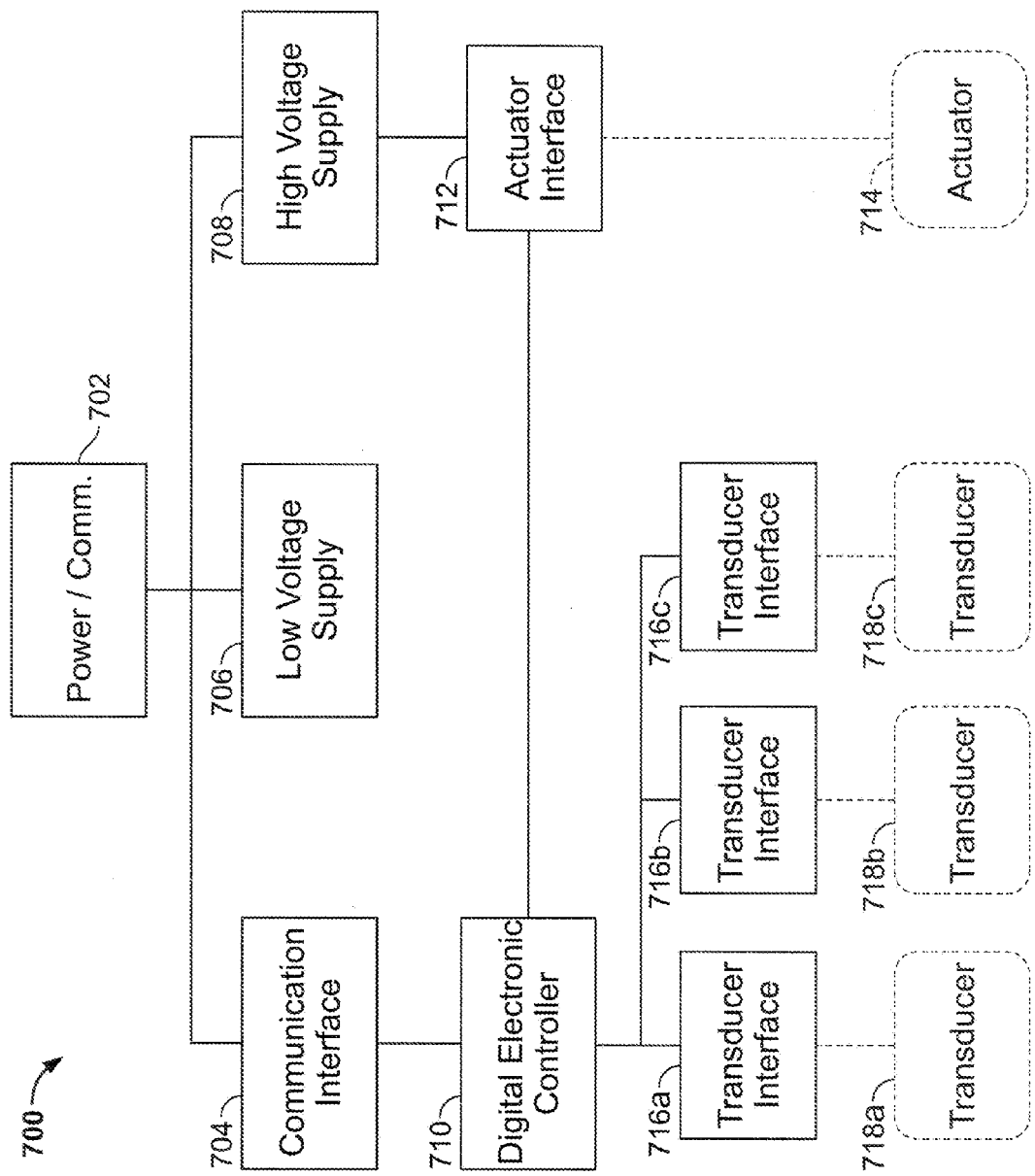
FIG. 7 is a block diagram showing example electronic components of a marine air gun.

FIG. 7 is a block diagram schematically illustrating example electronic modules 700 of a marine air gun. The electronic modules 700 include a power and communications module 702, a communication interface module 704, a low voltage supply module 706, a high voltage supply module 708, a digital electronic controller module 710, an actuator interface module 712, and transducer interface modules 716*a*, 716*b*, 716*c*. The actuator interface module 712 is communicably coupled to an actuator 714. Each transducer interface module 716*a*, 716*b*, 716*c* is communicably coupled to a transducer 718*a*, 718*b*, 718*c* as shown. The electronic modules 700 of a marine air gun may include fewer, additional and/or different components. The electronic modules 700 may all be housed in a common housing, or one or more of the electronic modules 700 may be housed in separate housings. For example, some or all of the electronic modules 700 may be included in the electronic circuitry 820 in the control housing 801 of the air gun 800 in FIGS. 8A and 8B. One or more of the electronic modules 700 may be mounted on a circuit board carried by the air gun. For example, in some implementations, one or more of the electronic modules 700 are installed on the control board 422 of FIG. 4D. In some implementations, the electronic modules 700 are installed on multiple circuit boards and/or other structures.

Figure 10A:
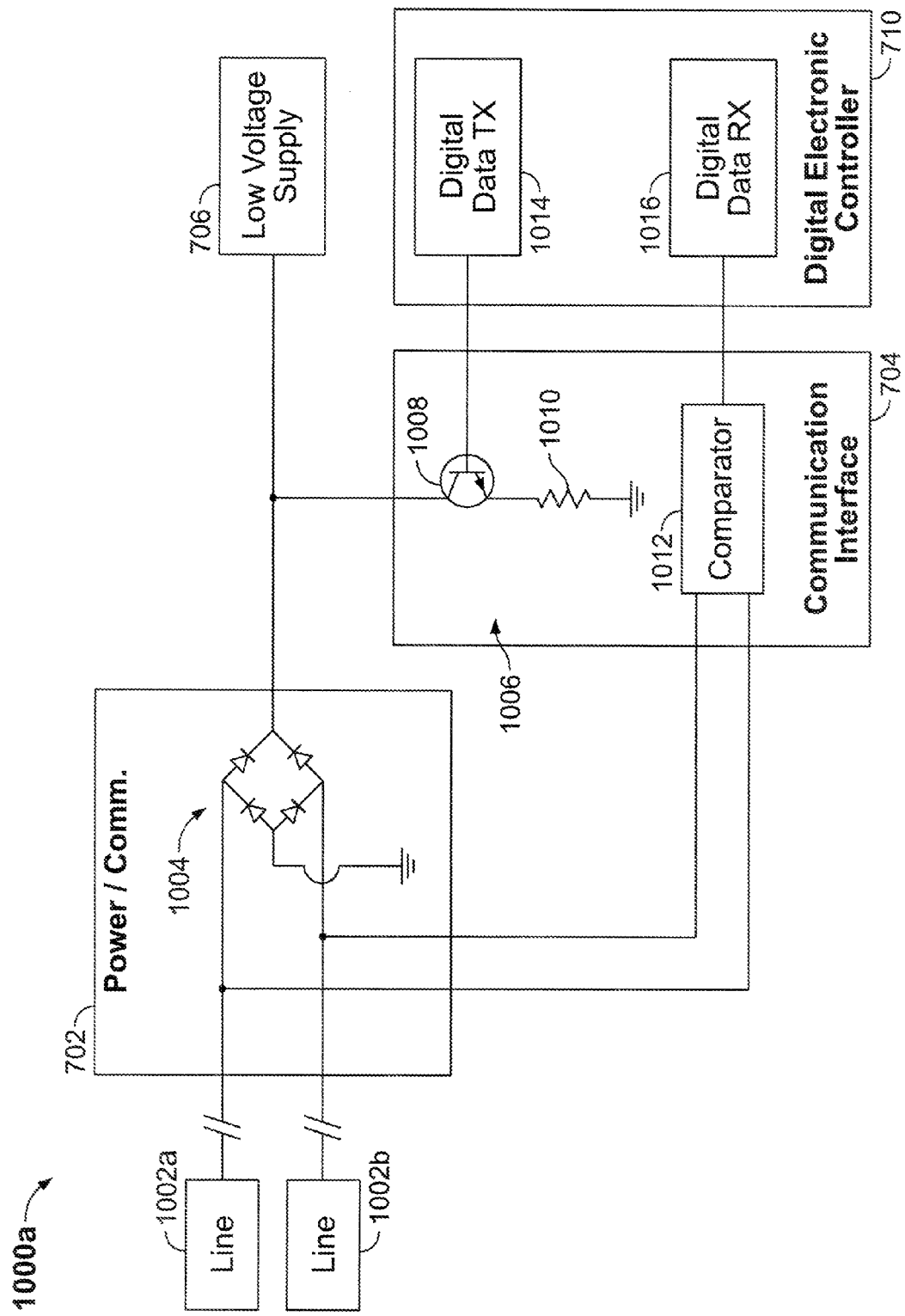
FIG. 10A is a block diagram showing example electronic components of a marine air gun.
Figure 11:
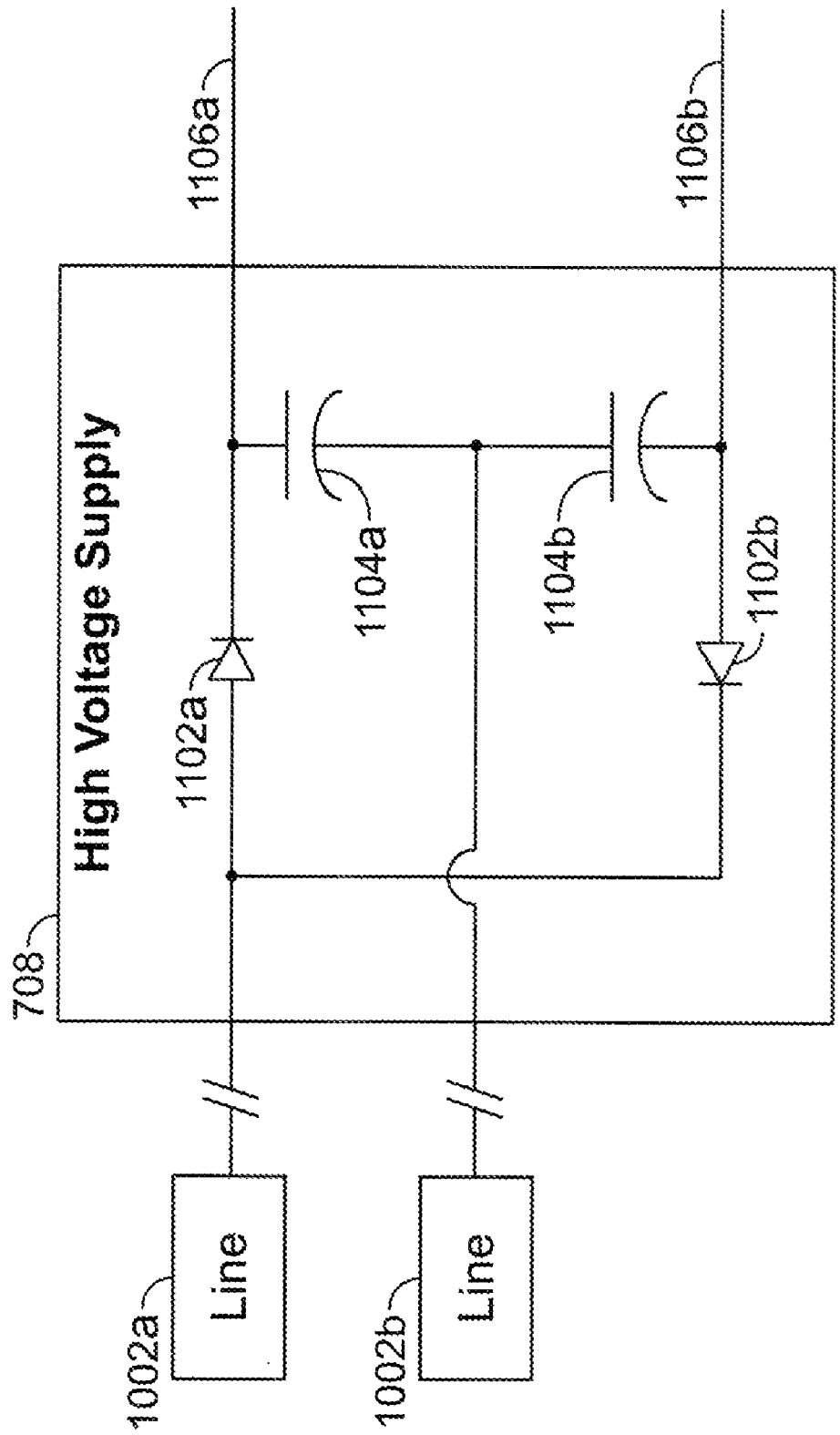
FIG. 11 is a block diagram showing an example high voltage supply of a marine air gun.

Each of the electronic modules 702, 704, 706, 708, 710, 712, 716*a*, 716*b*, 716*c* may include digital electronic circuitry. Digital electronic circuitry may include, for example, filters, digital logic gates (e.g., AND, OR, NAND, NOR, XOR, etc.), operational amplifiers, transistors, diodes, resistors, capacitors, and/or other components. One or more of the components may include analog electronic circuitry. Generally, connections among the electronic modules 700 and/or within each electronic module 702, 704, 706, 708, 710, 712, 716*a*, 716*b*, 716*c* may include any suitable electrical and/or mechanical couplings. Conductors may be electrically coupled by crimped, soldered, threaded, woven, pin-and-socket, and/or any other suitable type of couplings. In some instances, components in a common sealed chamber are connected by surface-mount soldered connections. In some instances, components in separate housings are coupled by internal or external links, which may include insulated wires, connectors, and/or other features. The input signals and output signals of each of the electronic modules 702, 704, 706, 708, 710, 712, 716*a*, 716*b*, 716*c* may include digital and/or analog signals. FIG. 10A shows features of an example implementation of the power and communications module 702, the communication interface module 704, and the digital electronic controller module 710. FIG. 11 shows features of an example implementation of the high voltage supply module 708.

The power and communications module 702 communicably couples the electronic modules 700 to an external system, subsystem, device, or module. For example, the power and communications module 702 may be coupled to an external communication link (e.g., the communication links 314*a*, 314*b*, 315, 317*a*, 317*b* of FIGS. 3A, 3B, and/or others) through a communication link connector (e.g., the communication link connector 410 of FIGS. 4C, 4D, and/or others). In some implementations, the power and communications module 702 is communicably coupled to the external system, subsystem, device, or module through a twisted pair. Additional and/or different communication links may be used. The external communication link may be communicably coupled to a command center for an air gun array (e.g., the command center 106 of FIG. 1).

The power and communications module 702 may receive power and communications from an external link, and provide the received power and/or communications to other electronic modules in the air gun. For example, the power and communications module 702 may receive a constant or time-varying voltage signal from the external link, and the power and communications module 702 may provide output to the communication interface module 704, the low voltage supply module 706, and/or the high voltage supply module 708 based on the voltage signal. The power and communications module 702 may also receive input from one or more of the electronic modules 700 of the air gun. For example, the power and communications module 702 may receive digital communications from the communication interface module 704 and transmit the received communications over an external link. As another example, the power and communications module 702 may receive power from the low voltage supply module 706 and use the power for operating components of the power and communications module 702.

The power and communications module 702 may provide the same output signal to each of the modules 704, 706, 708. For example, the power and communications module 702 may receive an input signal from an external communication link and split the input signal among the modules 704, 706, 708. The power and communications module 702 may provide different output signals to each module. For example, the power and communications module 702 may condition and/or modify the input signal and provide the conditioned and/or modified signal to one or more of the modules 704, 706, 708. In some implementations, the power and communications module 702 may filter, amplify, rectify, combine, superpose and/or otherwise condition or modify the signal for one or more of the modules 704, 706, 708.

The communication interface module 704 may receive input signals from the power and communications module 702. For example, the input signals may include digital communications received by the power and communications module 702 from an external communication link. The communication interface module 704 can convert the input signals to output signals suitable for the digital electronic controller module 710. For example, communication interface module 704 may convert input digital communication signals to binary voltage signals. In some implementations, a binary voltage signal is a voltage signal in one of two voltage ranges. For example, a low voltage range may be zero Volts to two Volts, and a high voltage range may be three Volts to five Volts. Different low and/or high voltage ranges may be used. The binary voltage signals may represent binary data. For example, a binary voltage signal in a low voltage range may represent logical 0, and a binary voltage signal in a high voltage range may represent logical 1. A binary voltage signal may be converted and/or stored in a bit of binary memory. In the example communication interface module 704 in FIG. 10A, a comparator 1012 converts the input voltage signals from a pair of conductors to binary voltage signals. In some implementations, the communication interface module 704 generates binary voltage signals in a different manner.

The communication interface module 704 may receive input signals from the digital electronic controller module 710. For example, the input signals may include digital communications for transmission to a command center over an external communication link. The input signals from the electronic controller module 710 may be formatted as binary voltage signals. The communication interface module 704 can convert the input signals to output signals suitable for transmission to an external system, subsystem, device, or module through the power and communications module 702. For example, the output signals may include current modulations, voltage modulations, and/or other types of signals that can be detected on the communication link by a command center. In the example communication interface module 704 in FIG. 10A, a transistor 1008 converts the input signals from binary voltage signals to current modulations. In some implementations, the communication interface module 704 generates current modulations in a different manner.

The low voltage supply module 706 receives input signals from the power and communications module 702. The input signal may include a rectified time-constant signal (e.g., direct current). The input signal may include a time-varying signal (e.g., alternating current). The low voltage supply module 706 may include a rectifier module that converts a time-varying signal to a time-constant signal. The low voltage supply module 706 may include additional filters, amplifiers, and/or other components. The low voltage supply module 706 may store power received from the power and communications module 702. For example, the low voltage supply module 706 may store the power in capacitor, batteries, and/or other suitable components. The low voltage supply module 706 can provide output power to one or more of the electronic modules, one or more of the transducers, and/or other devices and components. (Output connections of the low voltage supply module 706 are not shown in FIG. 7 for clarity.) The output from the low voltage supply module 706 may be a time-constant signal (e.g., direct current) or a time-varying signal (e.g., alternating current). The output from the low voltage supply module 706 may be include one or more voltage levels (e.g., 3.3 Volts, 5 Volts, and/or another voltage level).

The high voltage supply module 708 receives input signals from the power and communications module 702. The input signal may include a rectified time-constant signal (e.g., direct current). The input signal may include a time-varying signal (e.g., alternating current). The high voltage supply module 708 may include a rectifier that converts a time-varying signal to a time-constant signal. The high voltage supply module 708 may include additional filters, amplifiers, and/or other components. The high voltage supply module 708 may store power received from the power and communications module 702. For example, the high voltage supply module 708 may store the power in capacitor, batteries, and/or other suitable components. The high voltage supply module 708 can provide output power to the actuator 714 through the actuator interface module 712. The output from the high voltage supply module 708 may be include one or more voltage levels (e.g., 40 Volts, 80 Volts, and/or another voltage level).

The digital electronic controller module 710 can control one or more aspects of operation of the air gun. In the example shown, the digital electronic controller module 710 controls the electrical signal applied to the actuator 714 from the high voltage supply module 708. The digital electronic controller module 710 controls the electrical signal applied to the actuator 714 by controlling the state of the actuator interface module 712. The actuator interface module 712 can be a switch that can be turned on or off by the digital electronic controller module 710. For example, the actuator interface module 712 may include a transistor (e.g., a field effect transistor, a bipolar junction transistor, or another type of transistor) that has a conducting state and a non-conducting state. In some implementations, the digital electronic controller module 710 can apply a first binary voltage signal to the transistor to electrically couple the high voltage supply module 708 to the actuator 714, and the digital electronic controller module 710 can apply a second binary voltage signal to the transistor to electrically uncouple the high voltage supply module 708 and the actuator 714. In response to the electrical signal from the high voltage supply module 708, the actuator 714 may move to actuate a pressure release assembly of the air gun. For example, the actuator 714 may be the solenoid valve 424 of FIG. 4D, the solenoid valve 822 of FIGS. 8A and 8B, and/or another type of actuator. The electrical signal applied to the actuator 714 to actuate the pressure release assembly of the air gun may be, for example, 40 Volts, 80 Volts, or another voltage level.

The digital electronic controller module 710 may also control operation of the transducers 718a, 718b, 718c by controlling the transducer interface modules 716a, 716b, 716c. For example, the transducer interface modules 716a, 716b, 716c may include one or more switches (e.g., transistors and/or other types of electrically-controlled switches) controlled by the digital electronic controller module 710. The digital electronic controller module 710 may apply a binary voltage signal or another type of signal to the appropriate transducer interface module 716a, 716b, 716c to couple the digital electronic controller module 710 to the corresponding transducer 718a, 718b, 718c. Each of the transducers 718a, 718b, 718c may send analog data to the digital electronic controller module 710 through its respective transducer interface module 716a, 716b, 716c. The digital electronic controller module 710 may include a digitizer that digitizes the data from the transducers 718a, 718b, 718c. The digital electronic controller module 710 may include a digitizer (e.g., and analog-to-digital converter) that digitizes the data from the transducers 718a, 718b, 718c. The data may be digitized, for example, at 1 kHz, 10 kHz, 100 kHz, or a different frequency. The digital electronic controller module 710 may include a memory (e.g., a register, or another type of digital logic device) that stores the data from the transducers 718a, 718b, 718c. The transducers 718a, 718b, 718c may include a pressure transducer, a depth transducer, a zero-field hydrophone, and/or other types of transducers housed at the air gun. The transducers 718a, 718b, 718c may include a near-field hydrophone and/or other types of transducers housed apart from the air gun. Three transducers and transducer interface modules are shown in the example of FIG. 7. An air gun may include, and the digital electronic controller module 710 may be coupled to, less than or more than three transducers. In some implementations, one or more of the transducers detects the current received by the actuator (e.g., the solenoid valve) that actuates the pressure release assembly of the air gun.

The digital electronic controller module 710 may control operation of the communication interface module 704. For example, the digital electronic controller module may send digital communications to the communication interface module 704, and the communication interface module 704 may transmit the digital communications to an external communication link. The digital communications sent to the communication interface module 704 from the digital electronic controller module 710 may include data stored in a memory of the digital electronic controller module 710. The stored data may include digital data based on signals received from the transducers 718a, 718b, 718c and/or other data. The digital communications sent to the communication interface module 704 from the digital electronic controller module 710 may include the collected data message 1224 shown in FIG. 12 and/or other messages. The digital electronic controller module 710 may receive communications from the communication interface module 704. The communications received from the communication interface module 704 may include digital communications. The communications received from the communication interface module 704 by the digital electronic controller module 710 may include the arm message 1212, the fire command 1216, and/or the collected data message 1224 shown in FIG. 12 and/or other messages. In some instances, the digital electronic controller module 710 may receive communications directly from the power and communications module 702 and/or other electronic modules.

In an example implementation, the digital electronic controller module 710 includes a microcontroller manufactured by Microchip. An example microcontroller manufactured by Microchip that may be used to implement some or all aspects of the digital electronic controller module 710 is Microchip model number PIC24FJ64GA002. This example microcontroller includes 16 bit architecture, 16 MIPS CPU speed, flash memory, 64 kilobytes of program memory, 8192 bytes of RAM, an operating voltage of 2 to 3.6 Volts, digitizers, internal oscillators, and other features. The microcontroller may perform some or all of the described functionality of the digital electronic controller module 710. In some cases, the digital electronic controller module 710 includes additional and/or other components that perform the described functionality. For example, in addition to or instead of a microcontroller, the digital electronic controller module 710 may include a digitizer, a memory, a programmable processor, additional microcontrollers, a register, a state machine and/or additional or different digital electronic components.

Some of the functional operations described in this specification, which may include some or all of the functional operations of the digital electronic controller module 710, can be implemented in software, firmware, and/or hardware, including the structural means disclosed in this specification and structural equivalents thereof, or in combinations of them. Such functional operations can be implemented as instructions tangibly embodied in a computer-readable medium and/or in digital logic. Such instructions (also known as a program, code, or logic) can be executed by, or may control the operation of, a digital electronic controller. Such digital electronic controllers may include digital logic circuitry, microcontrollers, programmable processors, and/or others. The instructions can be written or encoded in any form of code, logic, or program language including compiled, executable, interpreted, assembly, machine, or custom language codes. Such instructions can be deployed in any form, including as a module, device, circuit, component, subroutine, file, sub-file, or other unit, which may be implemented as a standalone, integrated, or embedded system.

Digital electronic controllers may communicate with analog systems and/or devices by using one or more converters. For example, digital electronic controllers may include and/or utilize one or more digitizers that convert analog signals to digital signals suitable for digital processing, and digital electronic controllers may include and/or utilize one or more digital-to-analog converters that convert digit signals to analog signals. In some instances, all or part of a digital electronic controller may be implemented, for example, as an FPGA (field programmable gate array), an ASIC (application specific integrated circuit), and/or other types of devices.

Digital electronic controllers suitable for executing instructions tangibly embodied in a computer-readable medium and/or in digital logic devices may include programmable processors, microcontrollers, digital logic circuitry, and/or other types of devices. Such digital electronic controllers may store data in a memory and/or receive instructions and data from a memory. A memory can store binary data in machine-readable media, logic, circuitry and/or other configurations. Memory may include random access memory, read only memory, mass storage devices, volatile storage devices, non-volatile storage devices, and/or other types of memory. Memory may include magnetic devices, magneto optical devices, optical devices, semiconductor devices, and/or other types of devices. Additionally or alternatively, such digital electronic controllers may send information to and/or receive information from a communication interface, digital and/or analog circuitry, and/or electronic devices. For example, a digital electronic controller may interface with analog systems (e.g., sensor, controllers, actuators, etc.) through a digitizer. As another example, a digital electronic controller may include and/or utilize a communication interface that converts incoming communications to digital signals formatted for the digital electronic controller.

FIGS. 8A and 8B are schematic diagrams showing an example marine air gun 800. FIG. 8A shows the air gun 800 armed, and FIG. 8B shows the air gun 800 fired. Arming the air gun 800 prepares the air gun 800 to fire, and firing the air gun 800 generates an acoustic signal by releasing pressurized air into the water surrounding the gun 800. The air gun 800 includes a pressure release assembly 802 that generates the acoustic signal. The pressure release assembly carries a solenoid valve 822 and electronic circuitry 820. In the example air gun 800, the solenoid valve 822 and electronic circuitry 820 are housed by a control housing 801 carried on an end of the pressure release assembly 802. The control housing 801 may be integral with, mounted to, and/or otherwise carried by the pressure release assembly 802. The control housing 801 may include the same and/or similar features as the control housing 402 of the air gun 400 in FIGS. 4A, 4B, 4C, and 4D. For example, the control housing 801 may house one or more sensors and/or transducers, various connectors, and/or different or additional features. The control housing 801 may be modified and/or adapted for different types of pressure release assemblies and/or to interface with additional and/or different external systems.

The pressure release assembly 802 includes a housing 805 and a piston 808. The housing 805 defines chambers 804, 806 and ports 818. The pressure release assembly 802 includes seals 813, 815, 817 between the housing 805 and the piston 808. The housing 805 defines a port 803 that provides fluid communication between the chamber 804 and the air supply port 803 in the control housing 801. The housing 805 defines a firing port 807 and a port 809 that provide fluid communication between the chamber 804 and the solenoid valve chamber 832 in the control housing 801. The firing port 807 is sealed from the chamber 804 by the seals 813, 815 when the air gun 800 is in the armed position shown in FIG. 8A.

The piston 808 defines an inner port 810 that allows fluid communication between the chambers 804, 806. The piston 808 includes a flange 812 in the chamber 804 and a flange 816 in the chamber 806. A difference in the effective area of the flanges 812, 816 may create a pressure differential across the piston 808 that secures the piston 808 in the armed position shown in FIG. 8A. In some implementations, the piston 808 may be pressure balanced when the piston 808 is in the armed position. In FIG. 8A, the chambers 804, 806 store compressed air, and the piston 808 acts as a partition that prevents fluid communication between the chambers 804, 806 and the ports 818. In FIG. 8B, the piston 808 has been displaced and the ports 818 allow fluid communication from the chamber 806 out of the pressure release assembly 802.

The control housing 801 defines a sealed chamber that contains the electronic circuitry 820 and the solenoid valve 822. In some implementations, the electronic circuitry 820 may be contained in one or more sealed chambers separate from a sealed chamber that contains the solenoid valve 822. In the example shown, the electronic circuitry 820 and the solenoid valve 822 are secured in the control housing 801 by shock-absorbing material 819 in the control housing 801. The electronic circuitry 820 may include a digital electronic controller, a memory, a communication interface, a power supply, and/or different or additional electronic components. FIGS. 7, 10A, 10B, and 11 show example components and modules of electronic circuitry that may be housed in the control housing 801. The electronic circuitry 820 may receive power and/or communications from an external communication link through the communication link connector 824.

The solenoid valve 822 includes a housing 823 that contains a solenoid 834 and a plunger 830. The solenoid valve 822 defines a solenoid valve chamber 832 within the housing 823. The solenoid valve 822 defines ports 828, 826 that provide fluid communication between the solenoid valve chamber 832 and the ports 809, 807 of the pressure release assembly. In the armed position shown in FIG. 8A, the plunger 830 may seal to a sealing surface within the solenoid valve chamber 832 to prevent fluid communication from the solenoid valve chamber 832 into the firing port 807 of the pressure release assembly 802. In the firing position shown in FIG. 8B, the plunger 830 is moved from the sealing surface to allow fluid communication from the solenoid valve chamber 832 into the firing port 807 of the pressure release assembly 802. The solenoid 834 is mechanically coupled to the plunger 830 to move the plunger 830 in response to an electrical signal applied to the solenoid 834. The solenoid 834 is electrically coupled to the electronic circuitry 820, and the electronic circuitry 820 controls the electronic signal applied to the solenoid 834. In some example solenoid valves, the solenoid includes a conductive coil about a magnetic core, and the magnetic core is mechanically coupled to the plunger. In such examples, the electrical signal received by the solenoid generates a current in the conductive coil, the current creates a magnetic field, and the magnetic field exerts a force on the magnetic core, which moves the plunger to open the solenoid valve.

In one aspect of operation, the air gun 800 is configured as shown in FIG. 8A, and the air gun 800 is pressurized by an external source. The air gun 800 receives pressurized air from the external source through the connector 836. The pressurized air flows into the chamber 804 through the port 803. The pressurized air flows from the chamber 804 into the other pressure chamber 806 through the port 810. The pressurized air flows from the chamber 804 into the solenoid valve chamber 832 through the port 826. When the chambers 804, 806 have pressurized to a steady pressure, the pressure release assembly 802 is armed, or ready to fire. In some implementations, the chambers 804, 806 are pressurized to a latch pressure of 2000 psi, 3000 psi, or another pressure.

In one aspect of operation, the air gun 800 is initially configured as shown in FIG. 8A, and the pressure release assembly 802 is actuated. For example, the electronic circuitry 820 may fire the air gun in response to or based on commands or instructions received from a command center. To fire the air gun 800, a power supply of the electronic circuitry 820 is coupled to the solenoid valve 822. The power supply applies a voltage signal to the solenoid 834 of the solenoid valve 822. The voltage signal applied to the solenoid 834 moves the plunger 830 to open the port 828, as shown in FIG. 8B. For example, the voltage signal applied to the solenoid 834 may energize a coil of the solenoid 834, thereby creating a magnetic field that acts on a magnetic core of the solenoid 834, which in turn causes the magnetic core to move the plunger 830 away from the port 828. Movement of the plunger 830 opens the solenoid valve 822 and permits fluid communication between the solenoid valve chamber 832 and the firing port 807 of the pressure release assembly 802. The high pressure air communicated from the solenoid valve chamber 832 into the pressure release assembly 802 actuates the pressure release assembly 802.

In one aspect of operation, the air gun 800 is configured as shown in FIG. 8B, and the pressure release assembly 802 generates an acoustic signal. In the example shown, the pneumatic signal from the solenoid valve chamber 832 traverses the firing port 807 and creates a pressure imbalance on the piston 808. The pressure imbalance on the piston 808 urges the piston into the pressure chamber 804, as shown in FIG. 8B. Movement of the piston 808 opens the ports 818, allowing the pressurized air from the chamber 806 to exit the pressure release assembly 802 through the ports 818. The release of pressurized air through the ports 818 generates an acoustic signal in the water, represented in FIG. 8B by the wave fronts 840.

Figure 9A:
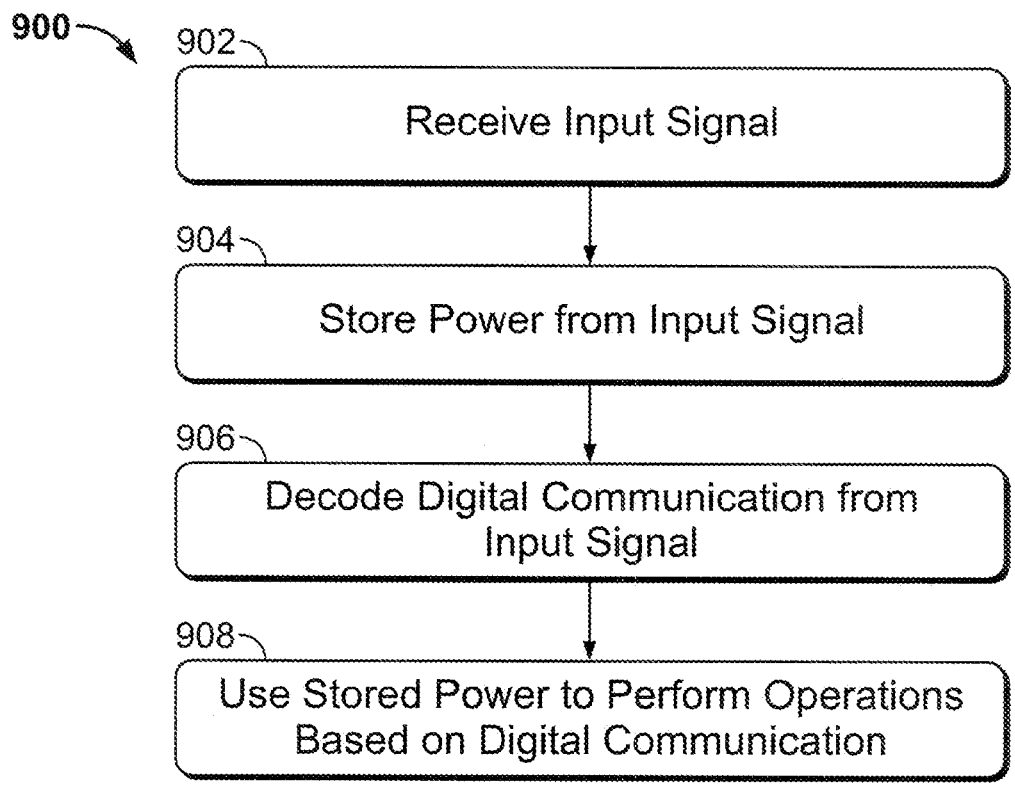
FIG. 9A is a flow chart showing an example process for operating a marine air gun.
Figure 9B:
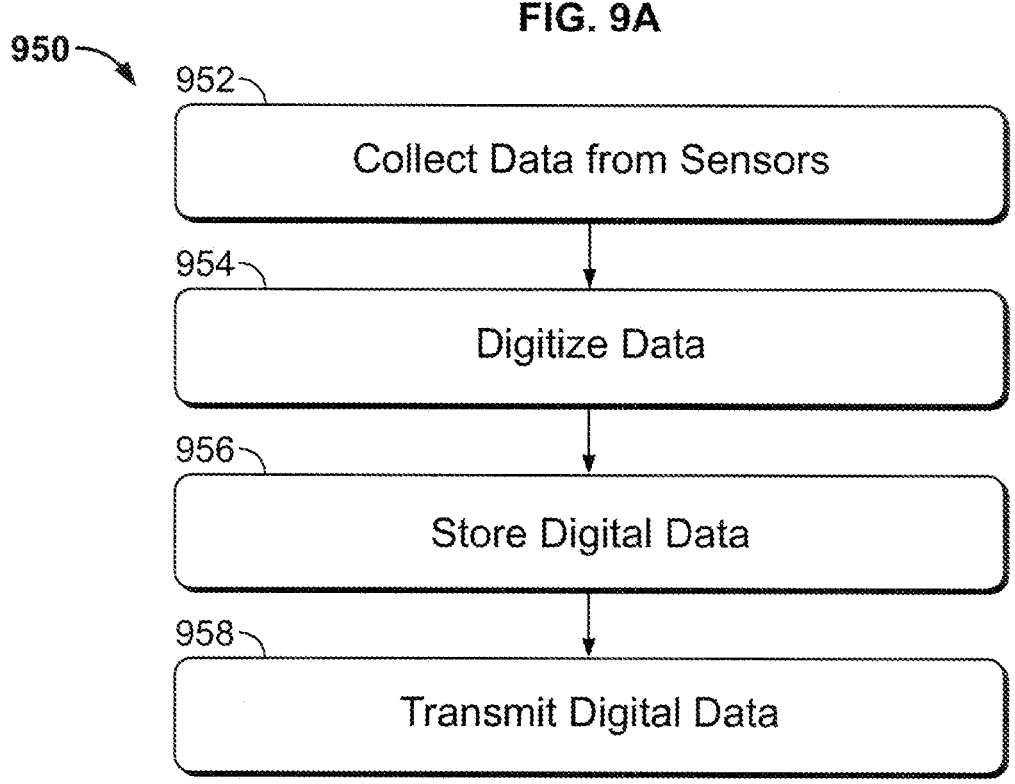
FIG. 9B is a flow chart showing an example process for operating a marine air gun.

FIGS. 9A and 9B are flow charts showing an example processes 900, 950 for operating a marine air gun. In some implementations, the example air guns 322a, 322b, 323, 400, 500, 600, 800 shown in FIGS. 3A-6B, 8A, and 8B and other marine air guns may operate in accordance with one or more operations of the processes 900, 950. One or more of the operations in the processes 900, 950 may be performed by the electronic components and/or modules shown in FIGS. 7, 10A, 10B, and 11, and/or by other components or modules. Each process 900, 950 may include different, additional, or fewer operations. The operations of each process 900, 950 may be performed in the order shown or in a different order. In some implementations, one or more of the operations of each processes 900, 950 may be iterated and/or performed simultaneously with other operations. In some implementations, one or more of the operations and/or subsets of the operations may be performed as part of a separate process or sub-process. Some of the processes and logic flows described in this specification, including the processes 900, 950 and others, can be carried out by one or more digital electronic controllers, which may include digital logic circuitry, microcontrollers, and/or programmable processors, executing instructions to operate on input data and generate output data.

The process 900 may be implemented by digital electronic circuitry housed at the marine air gun to control operation of a marine air gun based on digital communications received from a command center (e.g., the command center 106 of FIG. 1). At 902, an input signal is received. The input signal may be a voltage modulated electrical signal received by the air gun from a communication link external to the air gun. The input signal may include a command sent to the air gun from the command center. At 904, electrical power from the input signal is stored by the air gun. For example the electrical power may be stored in capacitors and/or other electrical devices housed in the air gun. At 906, digital communications are decoded from the input signal. For example, a communication interface at the air gun may convert voltage modulations in the input signal to digital data. The digital communications and/or digital data based on the communications may be stored in a memory housed in the air gun. The digital communications may instruct the air gun to perform an operation. For example, the digital communications may instruct the air gun to fire, to prepare to receive a fire command, to collect data from a transducer, to perform a quality control test, to transmit a status message, to power up, to power down, and/or to perform another operation. At 908, the air gun uses the power from the input signal to perform the operation based on the received digital communication. For example, the air gun may use the stored power to fire the air gun, the collect, digitize, store, and/or transmit data, and/or to perform other operations based on digital communications received from a command center. The air gun may alternatively or additionally use power received by the air gun before or after receiving the input signal.

The process 950 may be implemented by digital electronic circuitry housed at a marine air gun to collect digital data relating to operation of the marine air gun. At 952, data is collected by one or more sensors. The sensors may include sensors housed on the marine air gun and/or sensors housed apart from the marine air gun. The sensors may include a pressure sensor, a water depth sensor, a near-field hydrophone, a zero-field hydrophone, and/or others. The data collected by the sensors may be analog data. The data may be collected over a period of time, for example, 10 milliseconds, 100 milliseconds, 1 second, or another period of time. At 954, the data is digitized. The data may be digitized by a digitizer in the sensor, in an electronic controller, a separate A/D converter, and/or by another module. The digitizer may be housed at the air gun. For example, the digitizer may be housed in a sealed chamber defined in a housing of the air gun. The data may be digitized at a digitization frequency. For example, the data may be digitized at 1 kHz, 10 kHz, 100 kHz, and/or another frequency. At 956, the digitized data is stored. The digitized data may be stored in a memory of an electronic controller, a separate memory, in a logic device, in a machine-readable medium, and/or in another type of component. The digitized data may be stored in a component housed at the air gun. For example, the memory may be housed in a sealed chamber defined in a housing of the air gun. At 958, the digitized data is transmitted from the air gun. The air gun can include a communication interface that transmits the digital data over a communication link. The digitized data may be transmitted by a component housed at the air gun. For example, the communication interface may be housed in a sealed chamber defined in a housing of the air gun. The digital data may be transmitted by modulating current on the communication link.

Figure 10B:
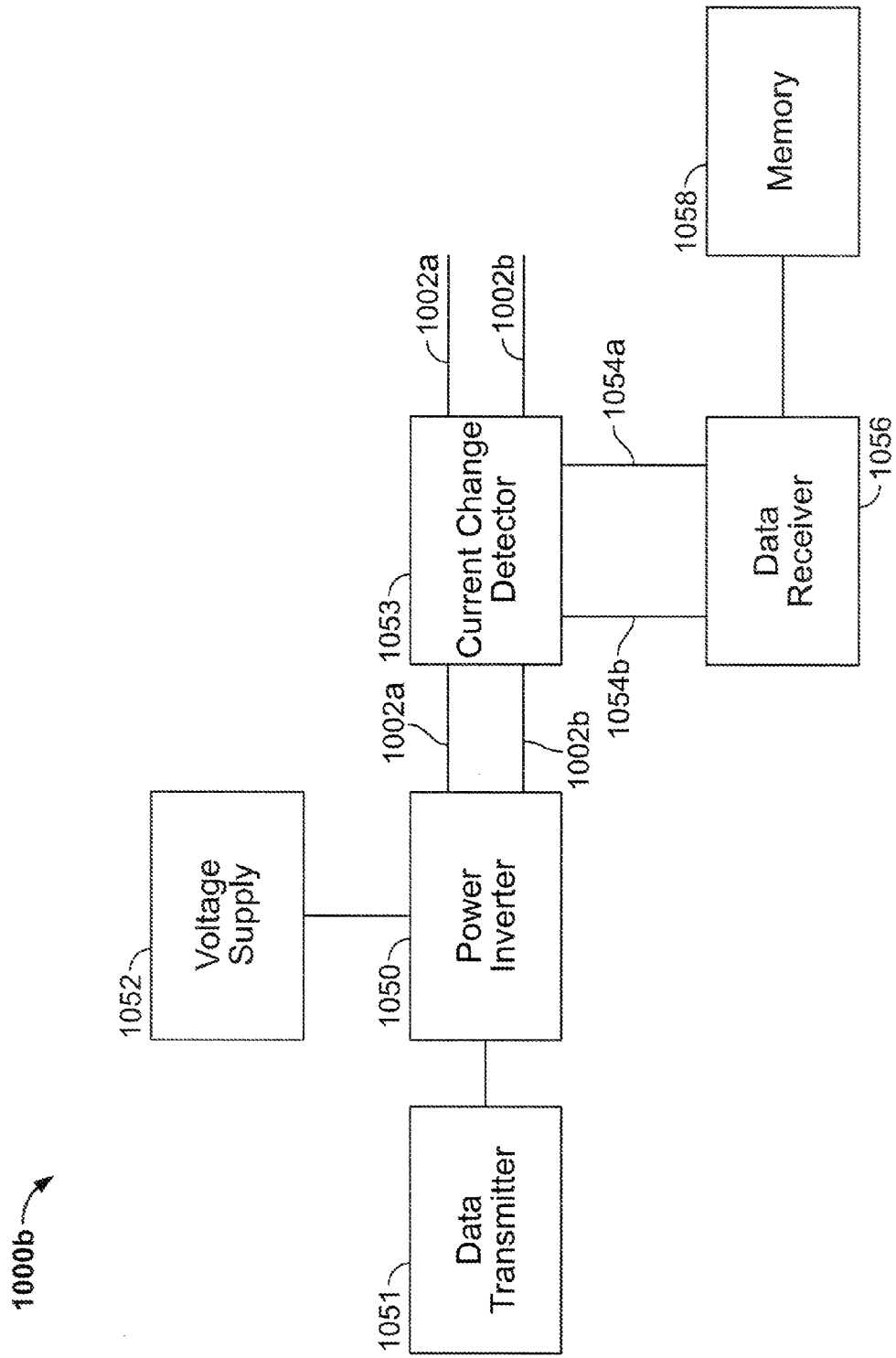
FIG. 10B is a block diagram showing example electronic components of a marine seismic command center.

FIGS. 10A and 10B are diagrams collectively showing an example communication system for a marine seismic system. The communication system includes an example air gun communication subsystem 1000a housed at a marine air gun (e.g., any of the marine air guns shown and described herein, including the air gun 1204 of FIG. 12, and/or others). In some instances, all or part of the air gun communication subsystem 1000a may be housed apart from the air gun, for example, on a hanger plate for an air gun cluster. The communication system includes an example command center communication subsystem 1000b housed at a command center (e.g., the command center 106 of FIG. 1, the command center 1202 of FIG. 12, and/or a different command center). In some instances, all or part of the command center communication subsystem 1000b may be housed apart from the command center and/or apart from the vessel. In some implementations, either of the communication subsystems 1000a, 1000b may interface with additional and/or different communication subsystems. The communication subsystems 1000a, 1000b are described here as sharing bidirectional communications. In some implementations, either of the communication subsystems 1000a, 1000b may be implemented in a transmitter-only or receiver-only configuration. As such, the communication subsystems 1000a, 1000b can be modified for unidirectional communications. The communication subsystems 1000a, 1000b each send and receive digital communications. In some implementations, one or both of the communication subsystems 1000a, 1000b sends and/or receives analog communications in addition to or instead of digital communications.

The air gun communication subsystem 1000a housed at a marine air gun includes a power and communications module 702, a low voltage supply module 706, a communication interface module 704, and a digital electronic controller module 710. The air gun communication subsystem 1000a may include fewer, additional and/or different components. The modules 702, 704, 706, 710 may be configured and/or function as shown and described with respect to FIG. 7. As shown in the example air gun communication subsystem 1000a in FIG. 10A, the power and communication module 702 includes a rectifier bridge 1004, the communication interface module 704 includes a current modulator 1006 and a comparator 1012, and the digital electronic controller includes a digital data transmitter 1014 and a digital data receiver 1016. The modules 702, 704, 710 of the air gun communication subsystem 1000a may include additional or different components housed at the air gun and/or elsewhere.

The example power and communications module 702 receives input from two conducting lines 1002a, 1002b. The conducting lines 1002a, 1002b may be conductors of a twisted pair, a coaxial cable, and/or another type of communication link. The conducting lines 1002a, 1002b may be included in a communication link external the air gun and/or a communication link connector. In some implementations, the conducting lines 1002a, 1002b each carry a high or a low voltage. For example, when the conducting line 1002a carries a high voltage (e.g., 20 Volts, 30 Volts, 40 Volts, or another voltage level), the other conducting line 1002b carries a low voltage (e.g., 0 Volts, or another ground reference voltage); and when the conducting line 1002a carries the low voltage, the other conducting line 1002b carries the high voltage.

In some instances, the conducting lines 1002a, 1002b may remain in a constant state for a period of time, where the high voltage remains on one of the conducting lines and the low voltage remains on the other conducting line. For example, when the air gun communication subsystem 1000a transmits data to the command center communication subsystem 1000b, the conducting line 1002a may remain at the high voltage and the conducting line 1002b may remain at the low voltage, or vice versa. In some instances, the high voltage and low voltage may switch back and forth between the conducting lines 1002a, 1002b over time, for example, at 10 kHz, 100 kHz, or another frequency. Digital communications may be encoded in such voltage modulations on the conducting lines 1002a, 1002b.

The communication interface module 704 may detect incoming digital communications based on voltage modulations on the conducting lines 1002a, 1002b. In the example shown in FIG. 10A, the comparator 1012 receives the input signal from both of the conducting lines 1002a, 1002b and generates an output signal based on the inputs. The output signal may be a binary voltage signal transmitted to the digital data receiver 1016. The digital electronic controller module 710 may store the received message and/or perform operations (e.g., fire the air gun and/or another operation) in response to the received message.

The comparator 1012 can generate the binary voltage signal that it communicates to the digital data receiver 1016 by converting voltage differences on the conducting lines 1002a, 1002b to binary voltage signals. For example, the comparator 1012 may convert a voltage difference to a binary voltage signal by comparing the voltage on the first conducting line 1002a and the voltage on the second conducting line 1002b and generating the binary voltage signal based on the comparison. As a specific example, the comparator 1012 may generate a high voltage signal when the voltage on the first conducting line 1002a is higher than the voltage on the second conducting line 1002b; and the comparator 1012 may generate a low voltage signal when the voltage on the second conducting line 1002b is higher than the voltage on the first conducting line 1002a. The low voltage supply module 706 and/or a high voltage supply module may receive electrical power from the power and communication module 702 at the same time that the communication interface module 704 receives and/or transmits communications.

The communication interface module 704 may also send outgoing digital communications to the command center communication subsystem 1000b through the conducting lines 1002a, 1002b. The communication interface module 704 may send digital communications by modulating current on one or both of the conducting lines 1002a, 1002b. The command center communication subsystem 1000b may detect the digital communications based on the current modulations. The current modulator 1006 may modulate current on the conducting lines 1002a, 1002b by toggling the state of a transistor 1008 between a conducting and non-conducting state. The transistor 1008 may be a field effect transistor, a bipolar junction transistor, or a different type of electrical switch. Switching the transistor 1008 to a conducting state may increase the current on one or both of the conducting lines, and switching the transistor 1008 to a non-conducting state may decrease the current on one or both of the conducting lines. In the example shown, the current modulator 1006 includes a resistor 1010 in series between the transistor 1008 and a ground reference voltage. The resistor may be a 5 ohm, 10 ohm, 15 ohm, 20 ohm, or different level resistor. The state of the transistor 1008 is controlled by the digital data transmitter 1014. The digital data transmitter 1014 may control the transistor 1008 by controlling a binary voltage signal applied to the transistor 1008. A different type of current modulator may be used.

The rectifier bridge 1004 converts a time-constant or time-varying voltage signal from the conducting lines 1002a, 1002b to a time-constant voltage signal. The rectifier bridge 1004 may include the four-diode bridge shown in FIG. 10A and/or additional or different components. The rectified (time-constant) voltage signal from the rectifier bridge 1004 is provided to the low voltage supply module 706. The low voltage supply module 706 may store electrical energy from the voltage signal. The low voltage supply module 706 may condition, modify, and/or distribute the electrical energy to components of the air gun.

The command center communication subsystem 1000b includes a power inverter module 1050, a data transmitter module 1051, a voltage supply module 1052, a current change detector module 1053, a data receiver module 1056, and a memory module 1058. The command center communication subsystem 1000b may include additional and/or different components. The voltage supply module 1052 provides electrical voltage that can be transmitted to the air gun communication subsystem 1000a housed at the air gun and/or used to power components of the command center communication subsystem 1000b housed at the command center. In some implementations, the voltage supply module 1052 provides a voltage of 30 Volts, 40 Volts, 50 Volts, or another voltage.

The power inverter module 1050 may include an H-bridge device. In some implementations, the H-bridge device includes a mover that modulates the electrical output of the H-bridge at a high frequency. For example, the mover may switch high and low voltage outputs of the H-bridge between two output terminals at a high frequency. The power inverter module 1050 outputs the electrical voltage from the voltage supply module 1052 to the conducting line 1002a or to the conducting line 1002b. When the power inverter module 1050 couples the voltage supply module 1052 to the conducting line 1002a, the power inverter module 1050 couples the conducting line 1002b to a ground reference voltage. When the power inverter module 1050 couples the voltage supply module 1052 to the conducting line 1002b, the power inverter module 1050 couples the conducting line 1002a to a ground reference voltage. The power inverter module 1050 may generate time-varying voltage differences across the conducting lines 1002a, 1002b by switching the high voltage output between the conducting lines 1002a, 1002b over time. Digital communications may be encoded in such voltage modulations. The digital communications may be detected at the air gun, for example by the comparator 1012 of FIG. 10A, based on the voltage modulations.

The data transmitter module 1051 may control the voltage modulations applied to the conducting lines 1002a, 1002b by sending binary voltage signals to the power inverter module 1050. The power inverter module 1050 may receive either a high or low binary signal from the data transmitter module 1051, and the power inverter module 1050 may output the electrical voltage from the voltage supply module 1052 to one of the two conducting lines 1002a, 1002b based on the binary voltage signal. For example, when the power inverter module 1050 receives a high voltage signal from the data transmitter module 1051, the power inverter module 1050 may couple the conducting line 1002a to the high voltage source (e.g., 40 Volts) and couple the conducting line 1002b to a ground reference voltage (e.g., 0 Volts); and when the power inverter module 1050 receives a low voltage signal from the data transmitter module 1051, the power inverter module 1050 may couple the conducting line 1002b to the high voltage source and couple the conducting line 1002a to the ground reference voltage. The voltage difference across the two conducting lines 1002a, 1002b may be modulated at a high frequency (e.g., 10 kHz, 100 kHz, or another frequency) to transmit digital data.

The current change detector module 1053 and the data receiver module 1056 can detect incoming digital communications based on current modulations on the conducting lines 1002a, 1002b. The current modulations may be the current modulations generated by the current modulator 1006 in the air gun communication subsystem 1000a. The current change detector module 1053 and/or the data receiver module 1056 may include additional components that filter out small changes in current or noise. The current change detector module 1053 and the data receiver module 1056 may detect incoming digital communication based on current modulations by converting changes in current on the conducting lines 1002a, 1002b to binary voltage signals. The current change detector 1053 may include transformers coupled to the conducting lines 1002a, 1002b. The transformer coupled to each conducting line 1002a, 1002b may convert current changes on the conducting line to voltage signals on one or both of the output lines 1054a, 1054b. For example, the current change detector 1053 may convert an increase in current on either conducting line to a voltage signal on the output line 1054a, and the current change detector 1053 may convert a decrease in current on either conducting line to a voltage signal on the output line 1054b.

The data receiver module 1056 receives the signals from the output lines 1054a, 1054b and generates a binary voltage signal based on the received signals. Data from the data receiver module 1056 may be stored in the memory module 1058. For example, each binary voltage signal from the data receiver module 1056 may be converted and/or stored as a bit in a binary memory of the memory module 1058. The data receiver module 1056 may include a set-reset device and/or another type of flip-flop device. The output line 1054a may be coupled to the set terminal of the set-reset device, and the output line 1054b may be coupled to the reset terminal of the set-reset device, or vice versa. The output lines 1054a, 1054b may both output a reference voltage signal when the current on the conducting lines 1002a, 1002b is in a steady state. The output line 1054a may output a high voltage signal when the current on either of the conducting lines 1002a, 1002b increases. The high voltage signal on the output line 1054a may be communicated to the set terminal of the set-reset device, which may toggle the binary voltage signal generated by the set-reset device. Toggling the binary voltage signal may change the signal from logical 1 to logical 0 or may change the signal from logical 0 to logical 1. The output line 1054b may output a high voltage signal when the current on either of the conducting lines 1002a, 1002b decreases. The high voltage signal on the output line 1054b may be communicated to the reset terminal of the set-reset device, which may toggle the binary voltage signal generated by the set-reset device.

FIG. 11 is a diagram showing an example high voltage supply module 708 of a marine air gun. The high voltage supply module 708 may receive input voltage signals from the conducting lines 1002a, 1002b of FIG. 10A. In some implementations, the conducting lines 1002a, 1002b carry a voltage difference of 30 Volts, 40 Volts, or another voltage level. The input voltage signals may include time-varying and/or time-constant voltage signals. A time-varying input voltage signal from the conducting lines 1002a, 1002b may be converted (e.g., by a rectifier bridge, or another device) to a time-constant signal within the high voltage supply module 708 or prior to entering the high voltage supply module 708.

The high voltage supply module 708 may include two output leads 1106a, 1106b. The output leads 1106a, 1106b may be communicably coupled to one or more of the electronic modules in FIG. 7 and/or additional or different systems, subsystems, devices, or modules. The output leads 1106a, 1106b may provide a voltage signal to an actuator (e.g., a solenoid valve, or another type of actuator) directly and/or indirectly through an actuator interface module. A digital electronic controller may control the voltage signal from the high voltage supply module 708 to the actuator by controlling the actuator interface module. Applying the voltage to the actuator may cause the actuator to actuate a pressure release assembly of the marine air gun. In some implementations, the output leads 1106a, 1106b carry a voltage difference of 60 Volts, 80 Volts, or another voltage level.

In the example shown, the high voltage supply module 708 includes two diodes 1102a, 1102b and two capacitors 1104a, 1104b. The high voltage supply module 708 may include additional or different components. The capacitors 1104a, 1104b are connected with each other in series. The conducting line 1002b connects between the capacitors 1104a, 1104b. The conducting line 1002a splits to connect on either side of both capacitors 1104a, 1104b. The diodes 1102a, 1102b are configured to apply the voltage difference between the conducting lines 1002a, 1002b across both capacitors 1104a, 1104b. The output leads 1106a, 1106b tap the voltage across both capacitors 1104a, 1104b. Thus, the voltage difference between output leads 1106a, 1106b is the combined voltage across both capacitors 1104a, 1104b. In some implementations, the voltage difference between output leads 1106a, 1106b is twice the voltage difference across the conducting lines 1002a, 1002b. For example, if the conducting lines 1002a, 1002b have a voltage difference of 40 Volts, the output leads 1106a, 1106b can have a voltage difference of 80 Volts. The capacitors 1104a, 1104b may be identical to each other or different. One or both of the capacitors may include a electrolytic capacitor. One or both of the capacitors may include hardened material, for example an aluminum casing, having robust mechanical properties. In some examples, the capacitors have a capacitance of 3300 microfarads, an equivalent series resistance of 44.0 milliohm, a voltage rating of 80 Volts, and a tolerance of ±20%. An example of a capacitor that may be used is the MLP flatpack, aluminum capacitor (e.g., part number MLP332M080EB0A) available from Cornell-Dubilier Electronics. Different types of capacitors may be used.

Figure 12:
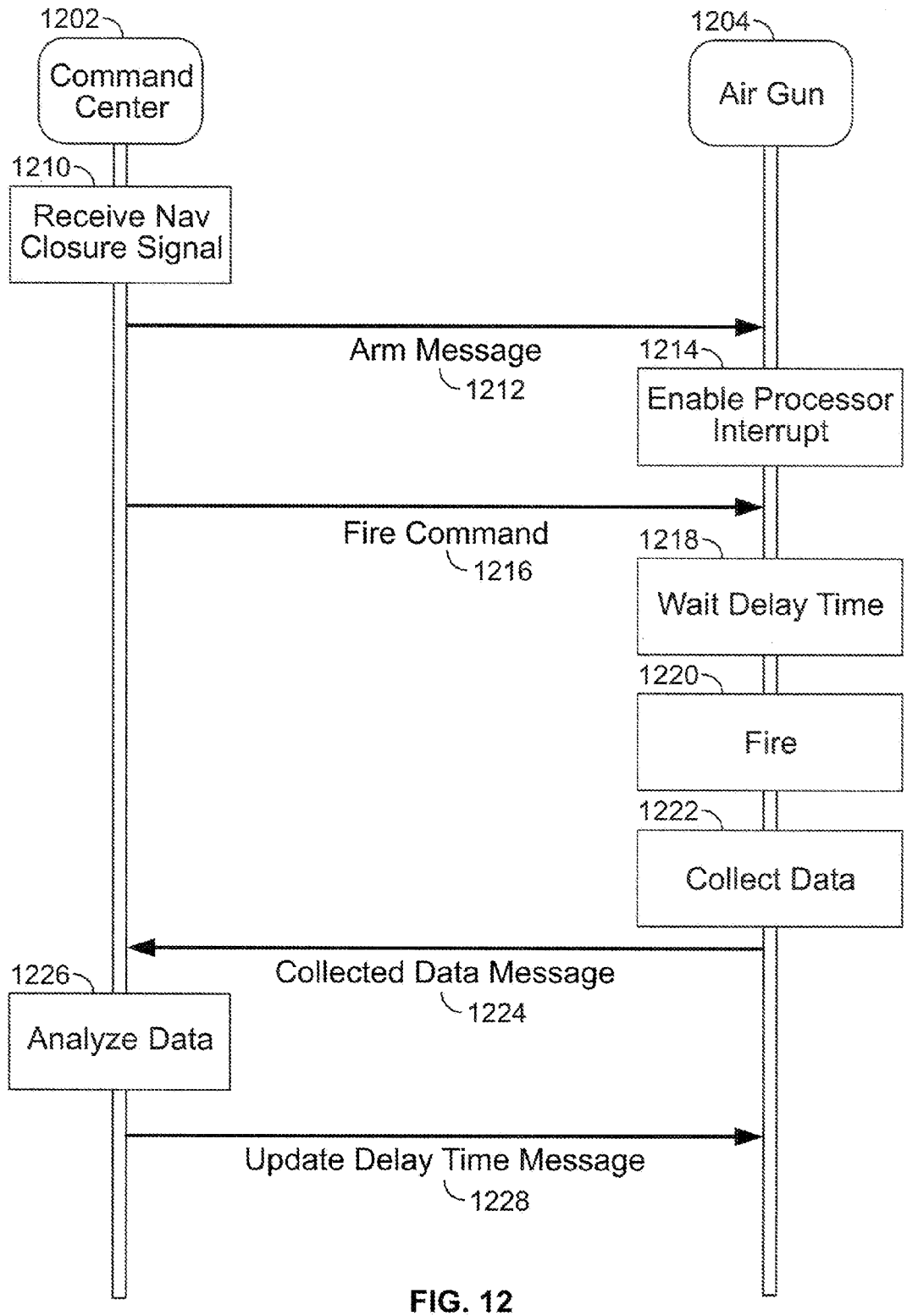
FIG. 12 is a signaling a flow chart showing an example process for operating a marine seismic source system.

FIG. 12 is a signaling a flow chart showing an example process 1200 for operating a marine seismic source system. For example, the process 1200 may be used to operate some aspects of the system 100 of FIG. 1. The process 1200 may include different, additional, or fewer operations. The operations of the process 1200 may be performed in the order shown or in a different order. In some implementations, one or more of the operations of the processes 1200 may be iterated and/or performed simultaneously with other operations. In some implementations, one or more of the operations and/or subsets of the operations may be performed as part of a separate process or sub-process.

In FIG. 12, operations are represented as being performed by a command center 1202 and/or an air gun 1204. In some implementations, another type of system or subsystem may perform one or more of the operations shown. The air gun 1204 may be an air gun of an air gun array, submersed in water, and towed behind a vessel to perform a marine seismic survey. The command center 1202 may include devices and/or structures located on the vessel and/or in different locations. The command center 1202 may be the command center 106 of FIG. 1, and the air gun 1204 may be included in one of the air gun clusters 120. In some implementations, the example air guns 322a, 322b, 323, 400, 500, 600, 800 shown in FIGS. 3A-6B, 8A, and 8B and other marine air guns may perform the operations of the air gun 1204. The process 1200 and/or some aspects of the process 1200 may be repeated each time the air gun array of the seismic source system generates a seismic signal. For example, the process 1200 may be repeated periodically (e.g., every second, 2 seconds, every 10 seconds, every minute, etc.) over several minutes or hours.

The communications in the process 1200 may be performed by the communications subsystems 1000a, 1000b of FIGS. 10A, 10B. The command center communication subsystem 1000b may perform one or more operations of the command center 1202, and the air gun communication subsystem 1000a may perform one or more operations of the air gun 1204. Some or all of the operations in the process 1200 may be performed by digital and/or analog electronic circuitry. Some or all of the communications in the process 1200 may be point-to-point digital communications between the command center 1202 and the air gun 1204. The communications in the process 1200 may be transmitted by one or more communication links between the command center 1202 and the air gun 1204. The communication links may include twisted pairs, fiber optics, coaxial cables, wireless links, and/or others.

At 1210, the command center 1202 receives a nav closure signal. The nav closure signal may be sent to the command center 1202 from a navigation center on a vessel (e.g., the navigation center 104 of the vessel 102 in FIG. 1). The nav closure signal instructs the command center 1202 to fire the air gun array. In response to the nav closure signal, the command center 1202 sends an arm message 1212 to the air gun 1204. In some implementations, the arm message 1212 is sent by the command center 1202 fifty milliseconds after receiving the nav closure signal. An arm message may be sent to each air gun in an air gun array. In some implementations, the arm message 1212 is a 16-byte digital message. The arm message 1212 may include or may be preceded by a header that identifies to which air gun(s) the arm message 1212 is addressed. In the example shown, the arm message 1212 is addressed to the air gun 1204. The arm message 1212 may be received by and/or addressed to additional air guns. In some implementations, the arm message 1212 may be disregarded by one or more of the additional air guns. In some implementations, one more of the additional air guns may react and/or respond to the arm message 1212.

The arm message 1212 instructs the air gun 1204 to prepare to receive a fire command. In response to the arm message 1212, the air gun 1204 may interrupt operation of a digital electronic controller of the air gun 1204. Interrupting the digital electronic controller may allow the digital electronic controller to receive and react to a fire command promptly. After sending the arm message 1212, the command center 1202 sends a fire command 1216 to the air gun 1204. In some implementations, the fire command 1216 is sent by the command center 1202 twenty-five milliseconds after sending the arm message 1212. A fire command may be sent to each air gun in an air gun array. In some implementations, the fire command 1216 is an electrical pulse applied to a communication link between the command center 1202 and the air gun 1204. The fire command 1216 may include or may be preceded by a header that identifies to which air gun(s) the fire command 1216 is addressed.

After receiving the fire command 1216, the air gun 1204 waits a delay time 1218. The delay time may vary for each air gun. For example, due to variations among air guns, each air gun in an array may take a different amount of time to fire. In some example air gun arrays, the firing time among air guns may vary by five to twenty milliseconds. Thus, each air gun has a firing delay time that can be adjusted individually for each gun so that the air guns in the array all fire simultaneously. The firing delay time may be a variable stored in a memory of the air gun. After waiting the delay time, the air gun 1204 fires at 1220. When the air gun 1204 fires, a pressure release assembly of the air gun 1204 releases an acoustic signal. To fire the air gun 1204, the digital electronic controller on the air gun 1204 may toggle a switch to couple the air gun actuator to a power supply. The actuator may move in response to an electrical signal from the power supply, and movement of the actuator may actuate the pressure release assembly to generate the acoustic signal by releasing compressed air.

Before, during, and/or after the air gun 1204 fires, the air gun 1204 collects data at 1222. For example, the air gun 1204 may collect data using one or more sensors housed on or near the air gun 1204. The sensors may include a pressure transducer, a depth transducer, a zero-field hydrophone, a near-field hydrophone, and/or other types of sensors. Data may be collected over several milliseconds, seconds or minutes. The air gun 1204 may digitize, store, and/or otherwise process the collected data. After collecting data, the air gun sends a collected data message 1224 to the control center 1202. The collected data message 1224 may include several digital messages transmitted over several seconds or minutes. In some implementations, the collected data message 1224 includes several kilobytes or megabytes of digital data. The collected data message 1224 may include or be preceded by an identifier that identifies the air gun 1204 as the source of the message 1224. The command center 1202 may receive a collected data message from each air gun in the array.

After receiving the collected data message 1224, the command center 1202 analyzes data associated with the seismic source system at 1226. The data analysis may be performed by a computing system that runs data processing software. The data analyzed by the command center 1202 may include some or all of the data from the collected data message 1224 and/or data from collected data messages received from other air guns in the array. The data analyzed by the command center 1202 may include additional and/or different data. The data analysis may, among other things, identify the firing time of the air guns in the array. For example, the data analysis performed by the command center 1202 may identify the time at which the air gun 1204 fired. The data analysis may identify one or more air guns that did not fire at the target time, i.e., one or more air guns that did not fire simultaneously with the other air guns in the array. As part of the data analysis, the command center 1202 may determine an updated delay time for the one or more air guns that did not fire at the target time, or the command center 1202 may determine a delay time for all of the air guns. After the data analysis, the control center 1210 sends an update delay time message 1228 to the air gun 1204. The update delay time message 1228 instructs the air gun to store an updated delay time in its memory. The updated delay time message 1228 can be a digital message, e.g., 16 bytes, 32 bytes, or a different size. The next time the air gun 1204 receives a fire command, the air gun 1204 waits for the updated delay time. Additional and/or different messages may be exchanged between the command center 1202 and the air gun 1204 before the next nav closure signal and/or at different times during the process 1200.

Some aspects of the systems and techniques described in this specification can be implemented in a communication system that includes networked devices operating in a master-slave, client-server, peer-to-peer, and/or another type of relationship. In some instances, the components of the system can be interconnected by various forms of data communication. For example, the components may operate in the context of a digital communication network and/or a digital point-to-point communication scheme. In some instances, analog communication schemes may be used. A communication network may include any form of digital data communication, such as a local area network ("LAN"), Ethernet, another standard type of network, and/or an ad-hoc network. The components may communicate according to any suitable communication protocol, which may include synchronous and/or asynchronous digital communication protocols.

A number of implementations have been described. Nevertheless, it will be understood that various modifications may be made. Accordingly, other implementations are within the scope of the following claims.

What is claimed is:

1. A marine air gun comprising:
   a pressure release assembly that releases compressed air into water to generate an acoustic signal;
   an actuator that moves to actuate the pressure release assembly in response to an electrical signal applied to the actuator, the actuator carried, as part of the marine air gun, by the pressure release assembly; and
   a digital electronic controller that controls the electrical signal applied to the actuator, the digital electronic controller carried, as part of the marine air gun, by the pressure release assembly.

2. The marine air gun of claim 1, further comprising one or more sensors carried by the pressure release assembly, the one or more sensors comprising at least one of a depth transducer, a pressure transducer, or a zero-field hydrophone, the digital electronic controller comprising:
   a digitizer that receives analog data from the one or more sensors and converts the analog data to digital data; and
   a memory that stores the digital data.

3. The marine air gun of claim 2, further comprising a communication interface carried by the pressure release assembly, the communication interface configured to:
   transmit the digitized data from the digital electronic controller to a central control system external the marine air gun; and
   receive digital communications from the central control system, the digital communications comprising commands that operate the digital electronic controller.

4. The marine air gun of claim 1, further comprising a high voltage supply carried by the pressure release assembly and electrically coupled to the actuator by a switch, the digital electronic controller communicably coupled to the switch to control the electrical signal applied to the actuator by the high voltage supply.

5. The marine air gun of claim 4, the high voltage supply comprising two capacitors each receiving an input voltage, the capacitors connected in series to provide an output voltage twice the input voltage.

6. The marine air gun of claim 5, wherein at least one of the two capacitors is an electrolytic capacitor.

7. The marine air gun of claim 1, further comprising a circuit board carried by the pressure release assembly, the circuit board comprising the digital electronic controller, a low voltage supply, a high voltage supply, and a communication interface.

8. The marine air gun of claim 1, the actuator and the digital electronic controller residing in an actuator housing carried by a separate housing of the pressure release assembly.

9. The marine air gun of claim 1, at least one of the actuator or the digital electronic controller residing in a chamber defined by a housing of the pressure release assembly.

10. The marine air gun of claim 1, the pressure release assembly defining one or more ports and comprising:
    a pressure chamber that stores the compressed air; and
    a partition that prevents fluid communication between the chamber and the one or more ports, actuation of the pressure release assembly moves the partition to permit communication of the compressed air into the water from the chamber through the one or more ports.

11. The marine air gun of claim 10, the actuator comprising a solenoid valve, a component of the solenoid valve moves to release a pneumatic signal in response to the electrical signal applied to the actuator, the pneumatic signal moves the partition to permit communication of the compressed air into the water from the chamber through the one or more ports.

12. A marine air gun comprising:
    a housing that houses:
       a pressure release assembly that releases compressed fluid to generate an acoustic signal;
       an actuator that moves to actuate the pressure release assembly in response to an electrical signal applied to the actuator; and
       a digital electronic controller that controls the electrical signal applied to the actuator.

13. The marine air gun of claim 12, wherein the housing further houses:
    a digitizer that receives analog data from one or more sensors and converts the analog data to digital data; and
    a memory that stores the digital data.

14. The marine air gun of claim 12, wherein the housing further houses a communication interface.

15. The marine air gun of claim 14, wherein the housing further houses a circuit board that includes the digital electronic controller and the communication interface.

16. The marine air gun of claim 12, wherein the housing includes a first sub-housing that houses the pressure release assembly.

17. The marine air gun of claim 16, wherein the housing includes a second sub-housing that houses the digital electronic controller.

18. The marine air gun of claim 12, further comprising a pressure sensor that detects an internal pressure of a pressure chamber of the pressure release assembly.

19. The marine air gun of claim 12, wherein the housing includes:
   a first sub-housing that houses the actuator; and
   a second sub-housing that houses the digital electronic controller.

20. A marine air gun comprising:
   a pressure release assembly that releases compressed air into water to generate an acoustic signal;
   an actuator that moves to actuate the pressure release assembly in response to an electrical signal applied to the actuator, the actuator carried by the pressure release assembly; and
   a digital electronic controller that controls the electrical signal applied to the actuator, the digital electronic controller carried by the pressure release assembly,
   at least one of the actuator or the digital electronic controller residing in a chamber defined by a housing of the pressure release assembly.

21. The marine air gun of claim 20, further comprising a pressure sensor that detects an internal pressure of a pressure chamber of the marine air gun.

22. The marine air gun of claim 21, further comprising a memory that receives data acquired by the pressure sensor.

23. The marine air gun of claim 20, wherein the digital electronic controller comprises a programmable processor.

24. The marine air gun of claim 20, wherein the digital electronic controller comprises a microcontroller.

25. The marine air gun of claim 20, wherein the pressure release assembly includes a partition that prevents fluid communication between a pressure chamber and a plurality of ports, and actuation of the pressure release assembly moves the partition to permit fluid communication between the pressure chamber and the plurality of ports.

26. The marine air gun of claim 25, wherein a component of the actuator moves to release a pneumatic signal in response to the electrical signal applied to the actuator, the pneumatic signal moves the partition to permit fluid communication between the pressure chamber and the plurality of ports.

27. The marine air gun of claim 20, further comprising a communication interface communicably coupled to the digital electronic controller.

* * * * *